US009812915B2

(12) United States Patent
Yazaki

(10) Patent No.: US 9,812,915 B2
(45) Date of Patent: Nov. 7, 2017

(54) ROTOR FOR ROTARY ELECTRIC MACHINE HAVING THROUGH PIECE HOLES AND RIBS

(71) Applicant: HONDA MOTOR CO., LTD., Tokyo (JP)

(72) Inventor: Manabu Yazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 14/490,674

(22) Filed: Sep. 19, 2014

(65) Prior Publication Data

US 2015/0084469 A1 Mar. 26, 2015

(30) Foreign Application Priority Data

Sep. 20, 2013 (JP) .................. 2013-195194

(51) Int. Cl.
*H02K 1/32* (2006.01)
*H02K 1/27* (2006.01)
*H02K 9/19* (2006.01)

(52) U.S. Cl.
CPC ............ *H02K 1/32* (2013.01); *H02K 1/276* (2013.01); *H02K 9/19* (2013.01)

(58) Field of Classification Search
CPC ........ H02K 1/32; H02K 1/276; H02K 1/2766; H02K 1/2773; H02K 9/19
USPC .......................... 310/156.53, 156.57, 156.47
See application file for complete search history.

(56) References Cited

U.S. PATENT DOCUMENTS

| | | | |
|---|---|---|---|
| 2009/0224619 A1* | 9/2009 | Okubo | H02K 1/278 310/156.25 |
| 2013/0020897 A1* | 1/2013 | Takizawa | H02K 1/276 310/156.01 |

FOREIGN PATENT DOCUMENTS

| | | | | |
|---|---|---|---|---|
| CN | 101577450 | | 11/2009 | |
| CN | 102664471 | | 9/2012 | |
| JP | 03-060855 U | | 6/1991 | |
| JP | 11-113202 | | 4/1999 | |
| JP | H1198739 A | * | 4/1999 | ............... H02K 1/32 |
| JP | 2004-194419 | | 7/2004 | |
| JP | 5118920 B2 | | 3/2009 | |
| JP | 2010-252419 | | 11/2010 | |

OTHER PUBLICATIONS

Machine translation of JPH1198739A (Apr. 1999).*

(Continued)

*Primary Examiner* — Michael Andrews
(74) *Attorney, Agent, or Firm* — Mori & Ward, LLP

(57) ABSTRACT

A rotor for a rotary electric machine includes a rotor core being rotatable around a rotational axis. The rotor core includes a plurality of steel plates stacked in a stacking direction. Each of the plurality of steel plates includes a plurality of magnet insertion piece holes, a plurality of through piece holes, a radially inner side annular ring, a radially outer side annular ring, and a plurality of ribs. The plurality of magnet insertion piece holes are provided at every first circumferential space. The plurality of magnet insertion piece holes constitute a plurality of magnet insertion holes in a state in which the plurality of steel plates are stacked in the stacking direction while the plurality of steel plates are rotated by the first circumferential space at every timing at which a predetermined number of the plurality of steel plates are stacked in the stacking direction.

17 Claims, 18 Drawing Sheets

(56) References Cited

OTHER PUBLICATIONS

Chinese Office Action for corresponding CN Application No. 201410471985.6, dated Jul. 12, 2016 (w/ English machine translation).
Japanese Office Action for corresponding JP Application No. 2013-195194, dated Oct. 11, 2016.
Chinese Office Action for corresponding CN Application No. 201410471985.6, dated Apr. 27, 2017.

* cited by examiner

BACKGROUND ART

BACKGROUND ART

ROTOR FOR ROTARY ELECTRIC MACHINE HAVING THROUGH PIECE HOLES AND RIBS

CROSS-REFERENCE TO RELATED APPLICATIONS

The present application claims priority under 35 U.S.C. §119 to Japanese Patent Application No. 2013-195194, filed Sep. 20, 2013, entitled "Rotor for Rotary Electric Machine." The contents of this application are incorporated herein by reference in their entirety.

BACKGROUND

1. Field

The present disclosure relates to a rotor for a rotary electric machine.

2. Description of the Related Art

A conventionally known rotor used for a rotary electric machine utilizes a rotor core which is formed by stacking a plurality of magnetic steel plates (see, for example, FIG. 17, FIG. 18, and Japanese Patent No. 5118920).

A conventional rotor 100 for a rotary electric machine as illustrated in FIG. 18 is formed of a plurality of stacked steel plates 101, and includes a rotor core 105 having a plurality of magnet insertion holes 103 which are formed at every first circumferential space (45° space), permanent magnets (not illustrated) each of which is inserted in a corresponding magnet insertion hole 103, and a rotor shaft (not illustrated) inserted in a shaft hole 107 which is formed at the center of each rotor core 105.

As illustrated in FIG. 17, the steel plate 101 included in the rotor core 105 has magnet insertion piece holes 103a which are formed at every first circumferential space (45° space), and a plurality of through piece holes 109a which axially penetrate the steel plate 101 at every second circumferential space (45° space) in a circumferential direction on the radially inner side of the magnet insertion piece holes 103a.

In the steel plate 101, a radially inner side annular ring 111a formed radially inward of the through piece holes 109a, and a radially outer side annular ring 113a formed radially outward of the through piece holes 109a are connected by a plurality of ribs 115 which are formed between the through piece holes 109a.

The rotor core 105 is formed by stacking a plurality of steel plates 101 having the same shape in the axial direction, and includes the magnet insertion holes 103 each formed of corresponding magnet insertion piece holes 103a of the steel plates 101, through holes 109 each formed of corresponding through piece holes 109a of the steel plates 101, and a radially inner side rotor core 111 and a radially outer side rotor core 113 which are respectively formed of the radially inner side annular rings 111a and the radially outer side annular rings 113a of the steel plates 101. That is, the rotor core 105 is in a shape achieved by extending a steel plate 101 in the stacking direction (the axial direction).

Also, in order to reduce nonuniform thickness of the stacked steel plates 101, the rotor core 105 may be formed such that one steel plate 101 axially adjacent to another steel plate 101 is rotated for the first circumferential space (45°) in a circumferential direction and stacked. Even in this case, because the first and second circumferential spaces have the same 45° space, the through piece holes 109a of axially adjacent steel plates 101 overlap when viewed in the axial direction, and the rotor core 105 is in the shape achieved by extending a steel plate 101 in the stacking direction (the axial direction).

However, in such a rotor core 105, the ribs 115 of the stacked steel plates 101 overlap when viewed in the axial direction, and thus stress concentration occurs at a radially inner side connecting portion 117 between the ribs 115 and the radially inner side annular ring 111a (the radially inner side rotor core 111). Therefore, in order to maintain the strength of the rotor core 105, it is preferable to increase the thickness of the radially inner side annular ring 111a (the radially inner side rotor core 111) locally at circumferentially overlapping area with the radially inner side connecting portion 117 and to increase the thickness of a rotor shaft locally which is to be inserted in the shaft hole 107. Practically, it is preferable to increase the thickness of the entire radially inner side annular ring 111a (the radially inner side rotor core 111) and to increase the thickness of the entire rotor shaft.

Because each through hole 109 is in the shape achieved by extending a through piece hole 109a in the axial direction, in the case where oil flows into a through hole 109 from a gap between the stacked steel plates 101 in the environment of oil (for liquid cooling), oil may be densely trapped in a particular one of the through holes 109. Such densely trapped oil in a particular through hole 109 may cause eccentricity (unbalance) of the rotor 100, and vibration and/or sound increase at the time of rotation, thereby reducing the marketability.

Thus, a solution to solve these problems may be given by using the rotor for a rotary electric machine described in Japanese Patent No. 5118920. The rotor for a rotary electric machine described in Japanese Patent No. 5118920 is fixed to a rotor shaft and includes a rotor core having a cooling medium passage. The rotor core is formed by stacking first and second plate-shaped members in the axial direction.

The first plate-shaped member has a first hole part that partially constitutes the cooling medium passage, and a first rotation regulation unit that is fitted into the rotor shaft and configured to regulate the rotation of the first plate-shaped member with respect to the rotor shaft. The second plate-shaped member is formed at a position which is circumferentially displaced with respect to the first hole part, and has a second hole part that partially constitutes the cooling medium passage, and a second rotation regulation unit that is fitted into the rotor shaft and configured to regulate the rotation of the second plate-shaped member with respect to the rotor shaft.

Stacking the first and second plate-shaped members in the axial direction allows communication between the first and second hole parts which are formed at circumferentially displaced positions, and when the first and second hole parts are overlapped, the hole parts are formed so as to surround the entire circumference of the rotor shaft as a whole. With this configuration, a cooling medium is supplied uniformly in the circumferential direction of the rotor core. Also, a rib between circumferentially adjacent first hole parts and a rib between circumferentially adjacent second hole parts are formed at circumferentially displaced positions, and thus concentration of a stress on the root of a rib may be reduced.

SUMMARY

According to one aspect of the present invention, a rotor for a rotary electric machine includes a rotor core being rotatable around a rotational axis. The rotor core includes a plurality of steel plates stacked in a stacking direction parallel to the rotational axis and has a plurality of magnet insertion holes at every first circumferential space. Each of the plurality of steel plates includes a plurality of magnet insertion piece holes, a plurality of through piece holes, a radially inner side annular ring, a radially outer side annular ring, and a plurality of ribs. The plurality of magnet insertion piece holes are provided at every said first circumferential space. The plurality of magnet insertion piece holes constitute the plurality of magnet insertion holes in a state in which the plurality of steel plates are stacked in the stacking direction while the plurality of steel plates are rotated by the first circumferential space at every timing at which a predetermined number of the plurality of steel plates are stacked in the stacking direction. The plurality of through piece holes penetrate each of the plurality of steel plates at every second circumferential space in the stacking direction on a radially inner side of the plurality of magnet insertion piece holes. The first circumferential space and the second circumferential space are different from each other. The radially inner side annular ring is provided on a radially inner side of the plurality of through piece holes. The radially outer side annular ring is provided on a radially outer side of the plurality of through piece holes. The plurality of ribs are provided between the plurality of through piece holes and connect the radially inner side annular ring and the radially outer side annular ring.

According to another aspect of the present invention, a rotor for a rotary electric machine includes a rotor core being rotatable around a rotational axis. The rotor core includes a plurality of steel plates stacked in a stacking direction parallel to the rotational axis and has a plurality of magnet insertion holes at every first circumferential space. Each of the plurality of steel plates includes a plurality of magnet insertion piece holes, a plurality of through piece holes, a radially inner side annular ring, a radially outer side annular ring, and a plurality of ribs. The plurality of magnet insertion piece holes are provided at every said first circumferential space. The plurality of magnet insertion piece holes constitute the plurality of magnet insertion holes in a state in which the plurality of steel plates are stacked in the stacking direction while the rotor core includes a first core in which a predetermined number of the plurality of steel plates are stacked in a predetermined direction, and a second core in which a predetermined number of the plurality of steel plates are stacked in a direction opposite to the predetermined direction of the first core. The plurality of through piece holes penetrate each of the plurality of steel plates at every second circumferential space in the stacking direction on a radially inner side of the plurality of magnet insertion piece holes. The radially inner side annular ring is provided on a radially inner side of the plurality of through piece holes. The radially outer side annular ring is provided on a radially outer side of the plurality of through piece holes. The plurality of ribs are provided between the plurality of through piece holes and connect the radially inner side annular ring and the radially outer side annular ring. The plurality of ribs are provided to extend in one of circumferential directions as the plurality of ribs come closer to a radially outer side.

According to further aspect of the present invention, a rotor for a rotary electric machine includes a rotor core being rotatable around a rotational axis. The rotor core includes a plurality of steel plates stacked in a stacking direction parallel to the rotational axis and has a plurality of magnet insertion holes at every first circumferential space. Each of the plurality of steel plates includes a plurality of magnet insertion piece holes, a plurality of through piece holes, a radially inner side annular ring, a radially outer side annular ring, and a plurality of ribs. The plurality of magnet insertion piece holes are provided at every said first circumferential space. The plurality of magnet insertion piece holes constitute the plurality of magnet insertion holes in a state in which the plurality of steel plates are stacked in the stacking direction while the plurality of steel plates are rotated by the first circumferential space at every timing at which a predetermined number of the plurality of steel plates are stacked in the stacking direction. The plurality of through piece holes penetrate each of the plurality of steel plates at every second circumferential space in the stacking direction on a radially inner side of the plurality of magnet insertion piece holes. The first circumferential space and the second circumferential space are different from each other. The radially inner side annular ring is provided on a radially inner side of the plurality of through piece holes. The radially outer side annular ring is provided on a radially outer side of the plurality of through piece holes. The plurality of ribs are provided between the plurality of through piece holes and connect the radially inner side annular ring and the radially outer side annular ring. The plurality of ribs are axially adjacent and circumferentially displaced when viewed in the stacking direction, and parts of the plurality of ribs overlap between a connecting portion with the radially inner side annular ring and a connecting portion with the radially outer side annular ring when viewed in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
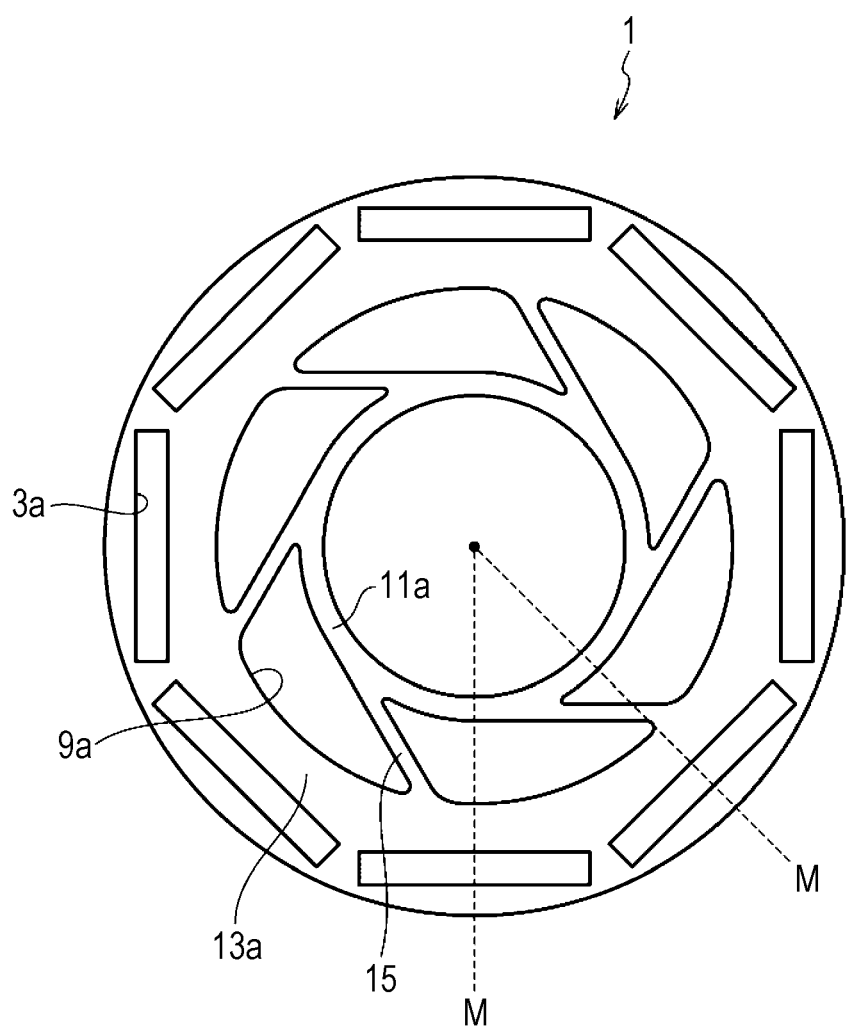
FIG. 1 is a front view of a steel plate according to a first embodiment.

The embodiments will now be described with reference to the accompanying drawings, wherein like reference numerals designate corresponding or identical elements throughout the various drawings.

Hereinafter, a rotor for a rotary electric machine according to each of the embodiments of the present disclosure will be described.

First Embodiment

Figure 3:
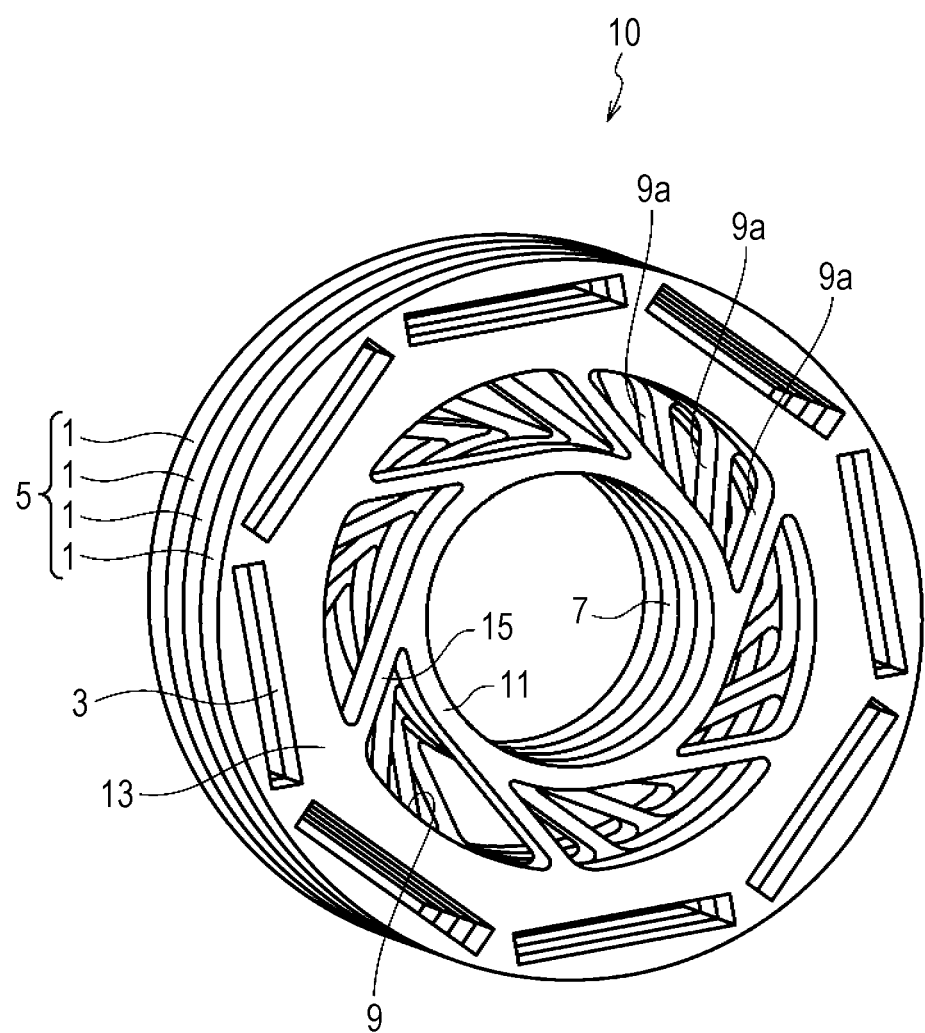
FIG. 3 is a perspective view of a rotor according the first embodiment.
Figure 4:
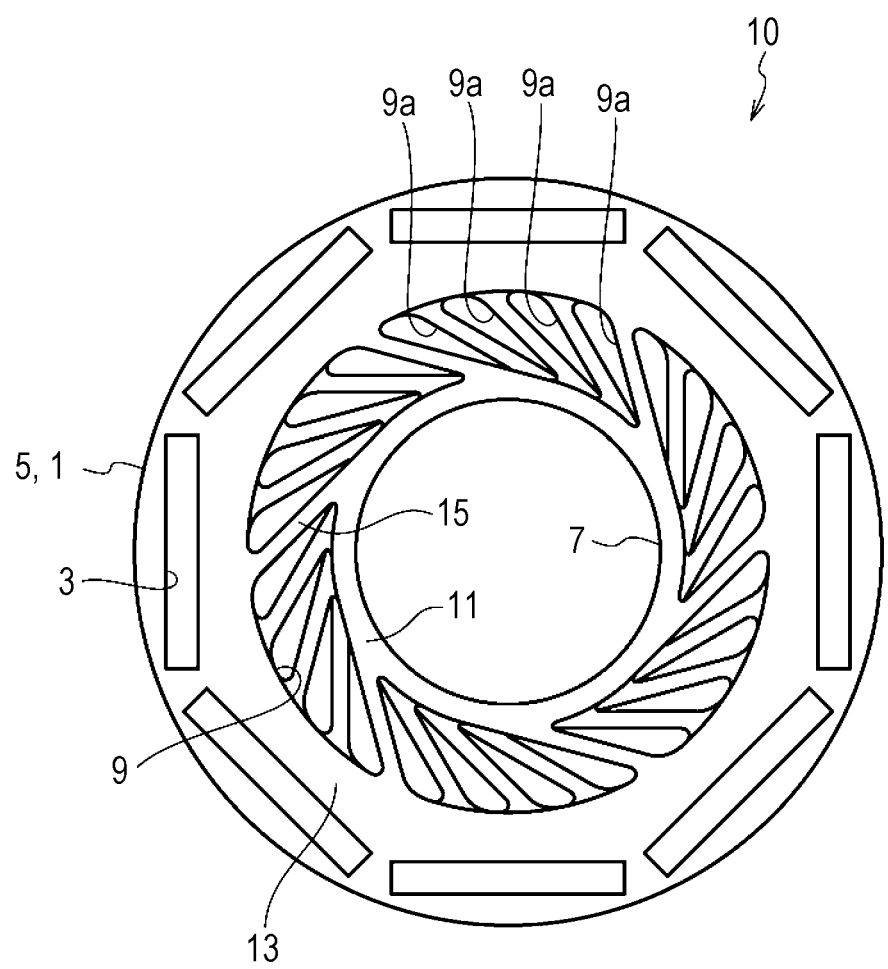
FIG. 4 is a front view of the rotor according to the first embodiment.

As illustrated in FIGS. 3 and 4, a rotor 10 for a rotary electric machine according to the present embodiment is formed of a plurality of stacked steel plates 1, and includes a rotor core 5 having a plurality of (8) magnet insertion holes 3 which are formed at every first circumferential space (45° space), permanent magnets (not illustrated) each of which is inserted in a corresponding magnet insertion hole 3, and a rotor shaft (not illustrated) inserted in a shaft hole 7 which is formed at the center of the rotor core 5.

As illustrated in FIG. 1, each of the steel plates 1 included in the rotor core 5 has a plurality of (8) magnet insertion piece holes 3a which are formed at every first circumferential space (45° space) circumferentially, and a plurality of (6) through piece holes 9a which axially penetrate the steel plate 1 at every second circumferential space (60° space) on the radially inner side of the magnet insertion piece holes 3a.

In the steel plate 1, a radially inner side annular ring 11a formed radially inward of the through piece holes 9a, and a radially outer side annular ring 13a formed radially outward of the through piece holes 9a are connected by a plurality of (6) ribs 15 which are formed between the through piece holes 9a. Here, the plurality of ribs 15 are formed to extend in one of circumferential directions (counterclockwise direction) as the ribs 15 come closer to the radially outer side. Therefore, each through piece hole 9a formed between adjacent ribs 15 has a cross-section which is substantially a wing shaped and asymmetrical with respect to an imaginary line M that extends radially through the circumferential center of each magnet insertion hole 3.

Figure 2:
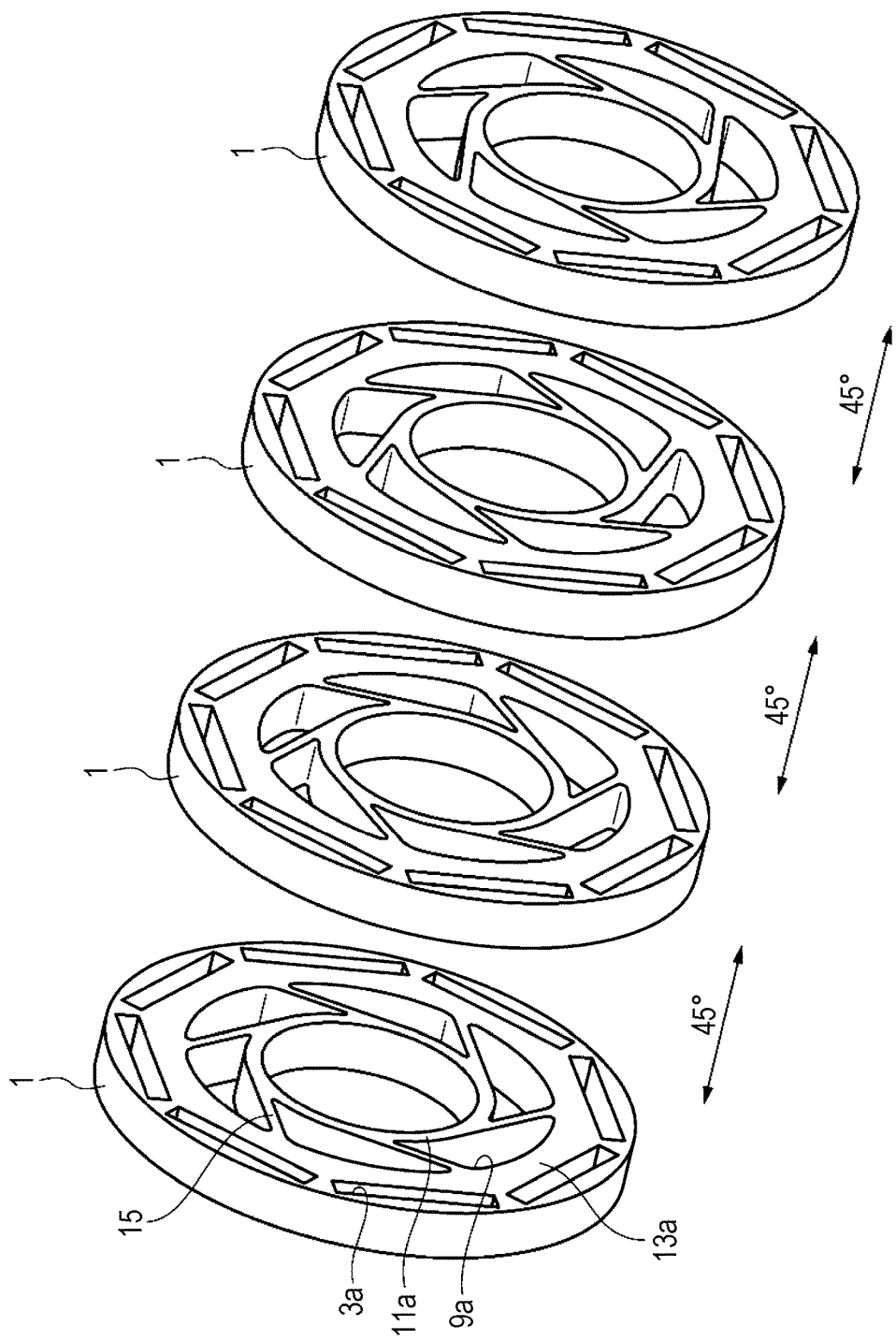
FIG. 2 is an illustration of a rotor which is formed by rotating and stacking steel plates.

As illustrated in FIG. 2, the rotor core 5 is formed by stacking a plurality of steel plates 1 having the same shape such that one steel plate 1 on top of another steel plate 1 is rotated for the first circumferential space (45°) in a circumferential direction with respect to the another steel plate 1. The methods of stacking the steel plates 1 with each steel plate rotated in a circumferential direction includes a method (what is called "rotational stacking" method) in which each of the steel plates 1 is stacked while being rotated in the process of punching the steel plates 1. Another method may be given in which the steel plates 1 are rotated in a circumferential direction and stacked in a process which is subsequent to punching and rotational stacking and is a step of incorporating (press-fitting) a rotor core into a rotor shaft, for example. Hereinafter, a description will be given assuming that the rotor core 5 is formed by rotationally stacking each of the steel plates 1 with the first circumferential space (45°).

Because the second circumferential space (60° space) is not an integral multiple of the first circumferential space (45° space), after rotational stacking is performed for the number of times (4 times) corresponding to the angle of the least common multiple (180°) of the second circumferential space (60° space) and the first circumferential space (45° space), the through piece holes 9a (ribs 15) in the current steel plate 1 are disposed at the original position.

As illustrated in FIGS. 3 and 4, the rotor core 5 formed of the steel plates 1 rotationally stacked in this manner includes the magnet insertion holes 3 each formed of corresponding magnet insertion piece holes 3a of the steel plates 1, through holes 9 each formed of corresponding through piece holes 9a of the steel plates 1, and a radially inner side rotor core 11 and a radially outer side rotor core 13 which are respectively formed of the radially inner side annular rings 11a and the radially outer side annular rings 13a of the steel plates 1.

Here, the through piece holes 9a of the steel plates 1 rotationally stacked in the axial direction communicate with each other axially with adjacent steel plates displaced by the difference (15°) between the first and second circumferential spaces in a circumferential direction. Thus, circumferentially adjacent through piece holes 9a in each steel plate 1 allow communication with each other via a through piece hole 9a of another steel plate 1 which is rotationally stacked in the axial direction. Consequently, a configuration is achieved in which all the through piece holes 9a of all the steel plates 1 communicate with each other, and thus in the environment of oil (for liquid cooling), it is possible to reduce occurrence of densely trapped oil in a particular through piece hole 9a and the eccentricity of the rotor 10 may be reduced.

Also, when the rotor core 5 is viewed in the axial direction (see FIG. 4), the number of ribs 15 that connect the radially inner side rotor core 11 and the radially outer side rotor core 13 is {the number (6) of ribs 15 that connect the radially inner side annular ring 11a and the radially outer side annular ring 13a in each steel plate 1× the number (4 times) of rotational stacking for disposing the ribs 15 of the steel plate 1 at the original position=24} which is larger than the number (6) of ribs 15 in each steel plate 1. Therefore, a stress applied to the rotor shaft and/or the radially inner side rotor core 11 is likely to be distributed, and thus increasing in size of the rotor shaft and/or the radially inner side rotor core 11 for the purpose of maintaining the strength of the rotor core 105 may be avoided.

Particularly, in the present embodiment, the second circumferential space (60° space) is not an integral multiple of the first circumferential space (45° space), and thus the number (24 in the present embodiment) of ribs 15 when viewed in the axial direction may be increased, the ribs connecting the radially inner side rotor core 11 and the radially outer side rotor core 13.

On the other hand, for example, in the case where the first circumferential space is set to 45° space similarly to the above-described embodiment and the second circumferential space is set to 90° space which is an integral multiple of the first circumferential space, the number of ribs 15 when the rotor core 5 is viewed in the axial direction is {the number (4) of ribs 15 in each steel plate 1× the number (2 times) of rotational stacking for disposing the ribs 15 of the steel plate 1 at the original position=8} which is a relatively small value.

As another example, in the case where the first circumferential space is set to 45° space similarly to the above-described embodiment and the second circumferential space is set to 180° space which is an integral multiple of the first circumferential space, the number of ribs 15 when the rotor core 5 is viewed in the axial direction is {the number (2) of ribs 15 in each steel plate 1× the number (4 times) of rotational stacking for disposing the ribs 15 of the steel plate 1 at the original position=8} which is a relatively small value.

By setting the second circumferential space to be an integral multiple of the first circumferential space in this manner, the number of ribs 15 of the rotor core 5 when viewed in the axial direction may be increased and a stress applied to the rotor shaft and/or the radially inner side rotor core 11 may be easily distributed.

In addition, by setting the second circumferential space (60° space) to be larger than the first circumferential space (45° space), the number of ribs 15 formed between the through piece holes 9a is relatively small, and thus when the steel plates are rotationally stacked, axially adjacent ribs 15 are not likely to overlap when viewed in the axial direction, and circumferentially adjacent through piece holes 9a may be likely to communicate with each other.

In the case where the second circumferential space is smaller than the first circumferential space, the number of ribs 15 formed between the through piece holes 9a is relatively large, and thus when the steel plates are rotationally stacked, the ribs 15 of axially adjacent steel plates 1 are likely to overlap when viewed in the axial direction. In this case, circumferentially adjacent through piece holes 9a are not likely to communicate with each other via a through piece hole 9a of another steel plate 1 which is rotationally stacked in the axial direction.

According to the present embodiment, a process of flipping over and stacking the steel plates 1 as in Japanese Patent No. 5118920 is unnecessary, and thus decrease in production efficiency may be reduced.

Figure 5:
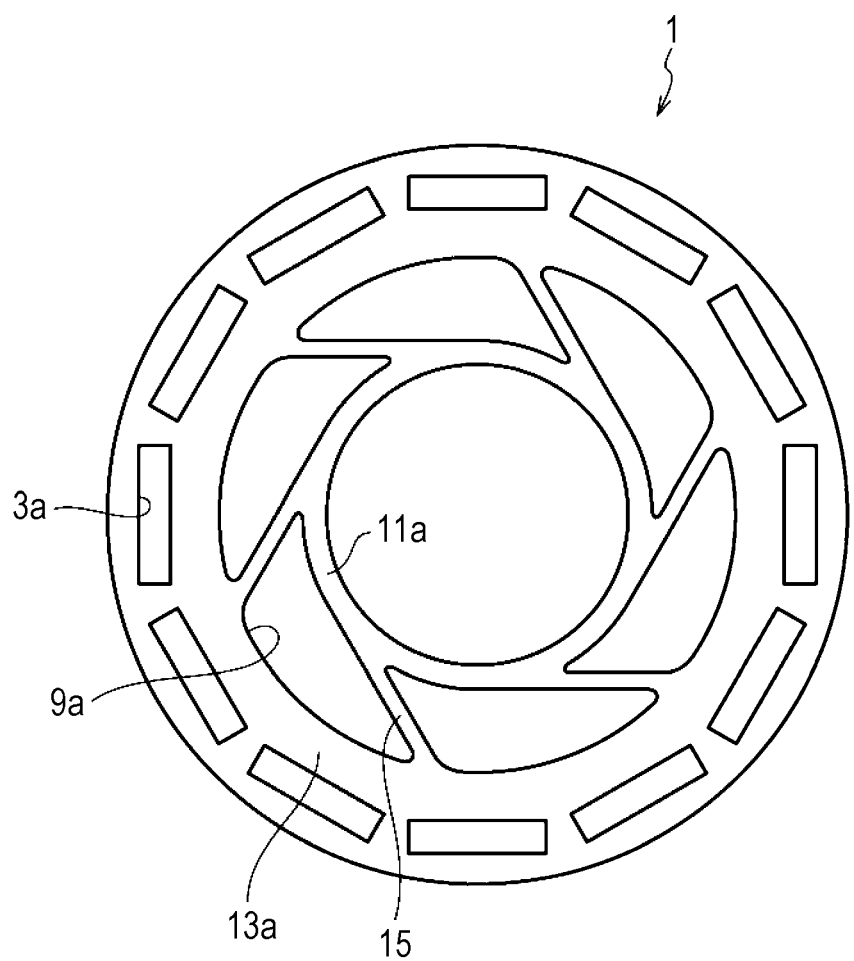
FIG. 5 is a front view of a steel plate according to a second embodiment.
Figure 6:
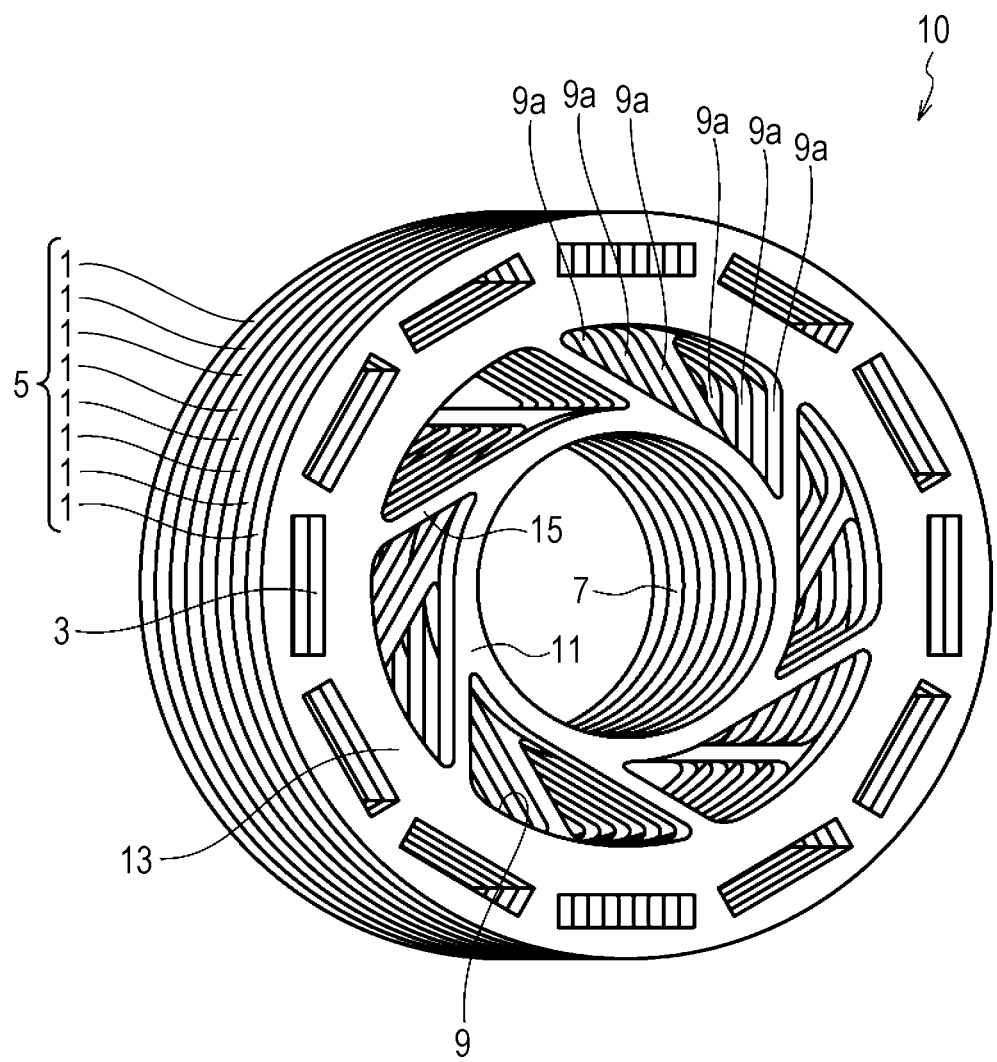
FIG. 6 is a perspective view of a rotor according to the second embodiment.

In the present embodiment, FIGS. 4 to 6 illustrate the manner in which the rotor core 5 is formed by rotationally stacking four steel plates 1. The rotor core 5, however, may be formed by rotationally stacking five or more steel plates 1.

Also, the rotor core 5 is not limited to be formed by rotationally stacking every steel plate 1 with the first circumferential space (45° space), and the rotor core 5 may be formed by rotationally stacking one out of every several steel plates 1 with the first circumferential space (45° space). That is, the rotor core 5 may be formed in such a manner that several steel plates 1 are stacked without being rotated in a circumferential direction so as to form a core block, and one axially adjacent core blocks is rotated with respect to the other for the first circumferential space and stacked.

When the rotor core 5 is formed by rotationally stacking the steel plates 1 with the first circumferential space, a general manufacturing device, which performs rotational stacking, allows circumferentially adjacent through piece holes 9a to communicate with each other via a through piece hole 9a of another steel plate 1 which is circumferentially rotated and axially stacked. Therefore, it is possible to reduce the complexity of the manufacturing device used for rotation of the steel plates in a circumferential direction.

In the case where the rotor core 5 to be mounted on a rotor shaft is formed such that several steel plates 1 are rotated for the first circumferential space and stacked, in contrast to the case where the rotor core 5 is formed by rotationally each of stacking the steel plates for example one by one, it is sufficient that a core block having several steel plates 1 stacked is rotated and stacked only for appropriate number of times when mounted on a rotor shaft, and thus increase in the number of rotations to be made may be reduced and decrease in manufacturing efficiency may be reduced.

Second Embodiment

Next, a rotor for a rotary electric machine according to a second embodiment of the present disclosure will be described. Because the rotor 10 in the present embodiment illustrated in FIGS. 6 and 7 has substantially the same configuration as that of the first embodiment, the same components are denoted by the same symbols and a description thereof will be omitted.

As illustrated in FIG. 5, in the present embodiment, the through piece holes 9a and the magnet insertion piece holes 3a are formed such that the second circumferential space (60° space) is an integral multiple of the first circumferential space (30° space).

Figure 7:
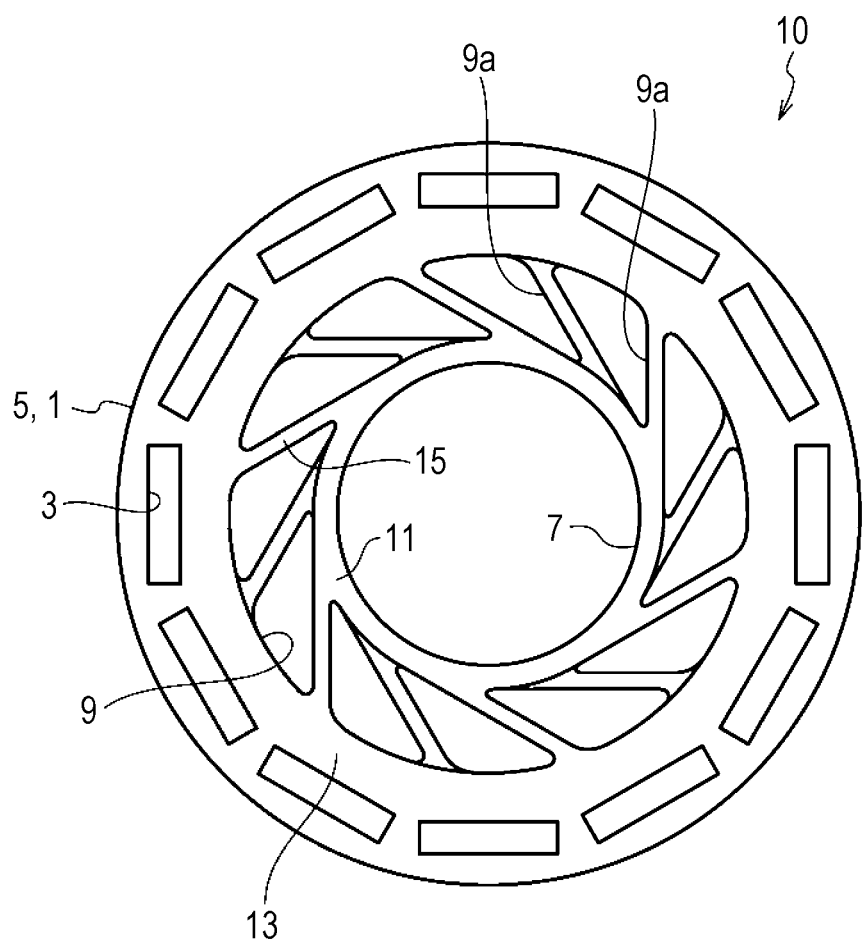
FIG. 7 is a front view of the rotor according to the second embodiment.

As illustrated in FIGS. 6 and 7, the rotor core 5 is formed by stacking (for example, rotational stacking) a plurality of steel plates 1 having the same shape such that each one steel plate 1 on top of another steel plate 1 is rotated for the first circumferential space (30°) with respect to the another steel plate 1. Because the second circumferential space (60° space) is an integral multiple of the first circumferential space (30° space), after rotational stacking is performed for the number of times (2 times) corresponding to the second circumferential space (60° space), the through piece holes 9a (ribs 15) in the current steel plate 1 are disposed at the original position.

With this configuration, the through piece holes 9a of the steel plates 1 rotationally stacked in the axial direction communicate with each other axially with adjacent steel plates displaced by the difference (30°) between the first and second circumferential spaces in a circumferential direction. Consequently, circumferentially adjacent through piece holes 9a with the second circumferential space (60° space) therebetween in each steel plate 1 uniformly (approximately 30° each) communicate with a through piece hole 9a of another steel plate 1 which is rotationally stacked in the axial direction. Therefore, circumferentially adjacent through piece holes 9a may be likely to communicate with each other, and thus it is possible to reduce occurrence of densely trapped oil in a particular through piece hole 9a and the eccentricity of the rotor 10 may be further reduced.

In the first and second embodiments described above, the first circumferential space is set to be smaller than the second circumferential space. However, without being limited to this, the first circumferential space may be set to be larger than the second circumferential space. In this case, the number of ribs 15 formed between the through piece holes 9a may be made relatively large, and thus a stress applied to the rotor shaft and/or the radially inner side rotor core 11 may be easily distributed via the ribs 15. Particularly, when the first circumferential space is set to be a non-integral multiple of the second circumferential space, after rotational stacking is performed for the number of times corresponding to the angle of the least common multiple of the first circumferential space and the second circumferential space, the through piece holes 9a (ribs 15) in the current steel plate 1 are disposed at the original position. Therefore, the number of ribs 15 when viewed in the axial direction may be increased, the ribs connecting the radially inner side rotor core 11 and the radially outer side rotor core 13, and thus a stress applied to the rotor shaft and/or the radially inner side rotor core 11 may be easily distributed via the ribs 15.

Third Embodiment

Next, a rotor for a rotary electric machine according to a third embodiment of the present disclosure will be described. Because the rotor 10 in the present embodiment illustrated in FIGS. 10 and 11 has substantially the same configuration as that of the first and second embodiments, the same components are denoted by the same symbols and a description thereof will be omitted.

Figure 8A:
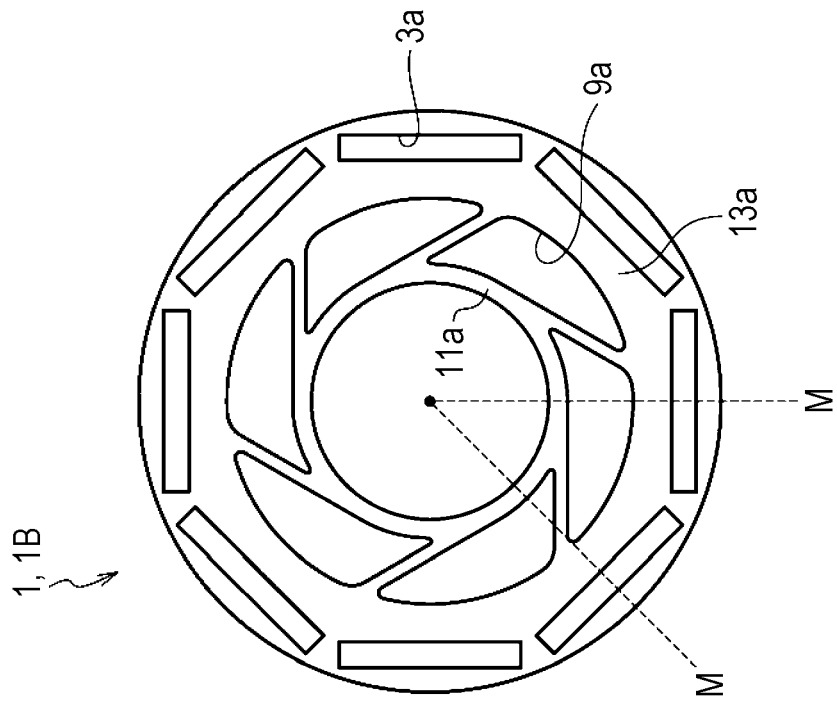
FIG. 8A is a front view of a steel plate according to a third embodiment.
Figure 8B:
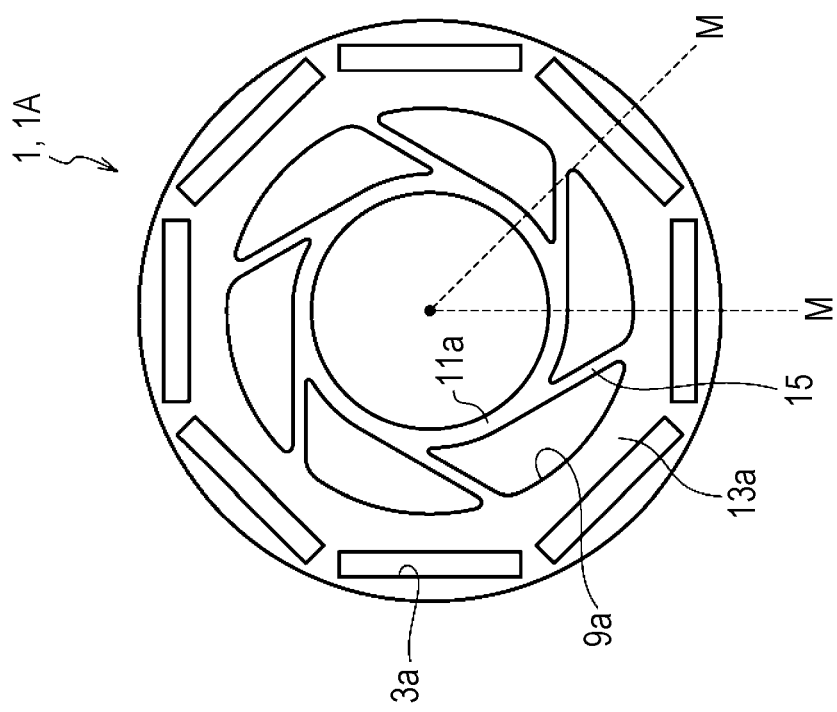
FIG. 8B is a front view of the steel plate of FIG. 8A after flipped over.

As illustrated in FIG. 8A, the steel plate 1 in the present embodiment is the same as the steel plate 1 (FIG. 1) in the first embodiment, and hereinafter may be referred to as a first steel plate 1A for the sake of description. The steel plate 1 illustrated in FIG. 8B is obtained by turning (flipping) over the first steel plate 1A, and hereinafter may be referred to as a second steel plate 1B for the sake of description.

Figure 9:
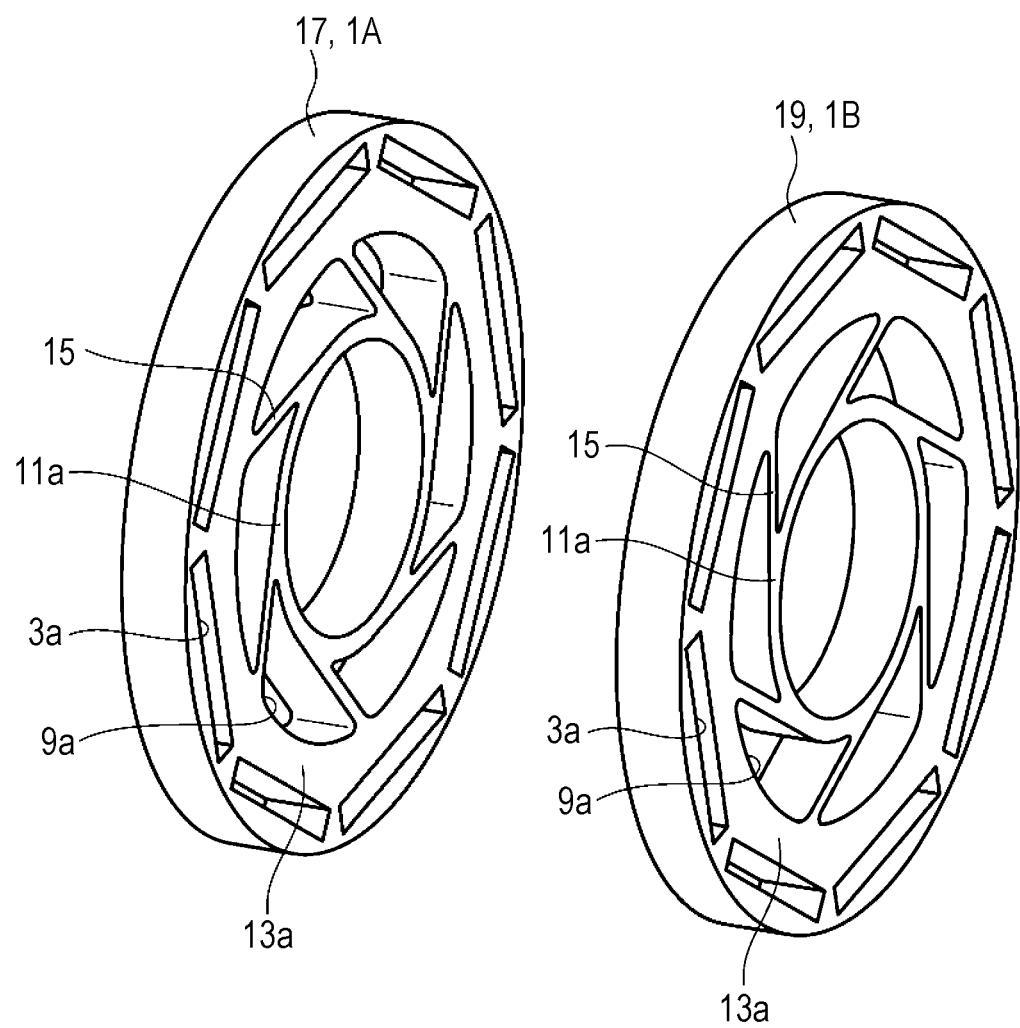
FIG. 9 illustrates perspective views of a first core and a second core.

FIG. 9 illustrates a first core 17 in which a plurality of first steel plates 1A is stacked in a predetermined direction, and a second core 19 in which a plurality of second steel plates 1B is stacked in a predetermined direction. That is, it may be said that the second core 19 is formed by stacking the first steel plates 1A in a direction opposite to the stacking direction of the first core 17.

The rotor core 5 is formed by stacking the first and second cores 17, 19 so that the positions of the magnet insertion piece holes 3a overlap.

Figure 10:
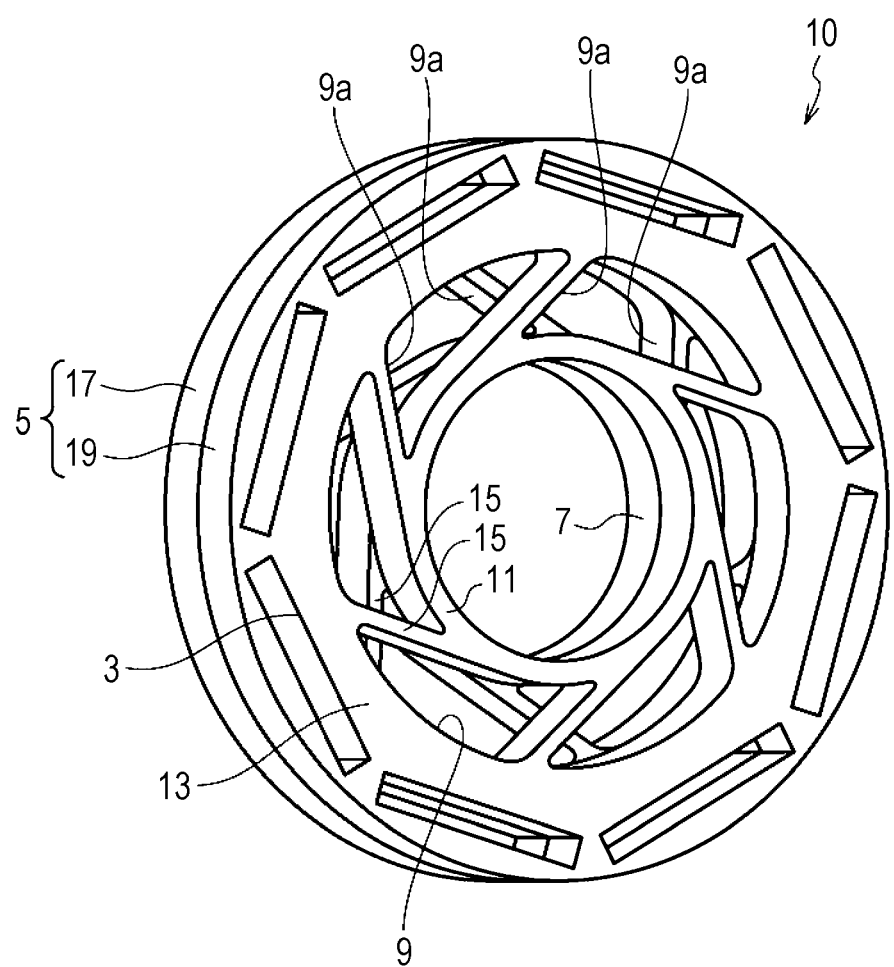
FIG. 10 is a perspective view of a rotor according to a third embodiment.
Figure 11:
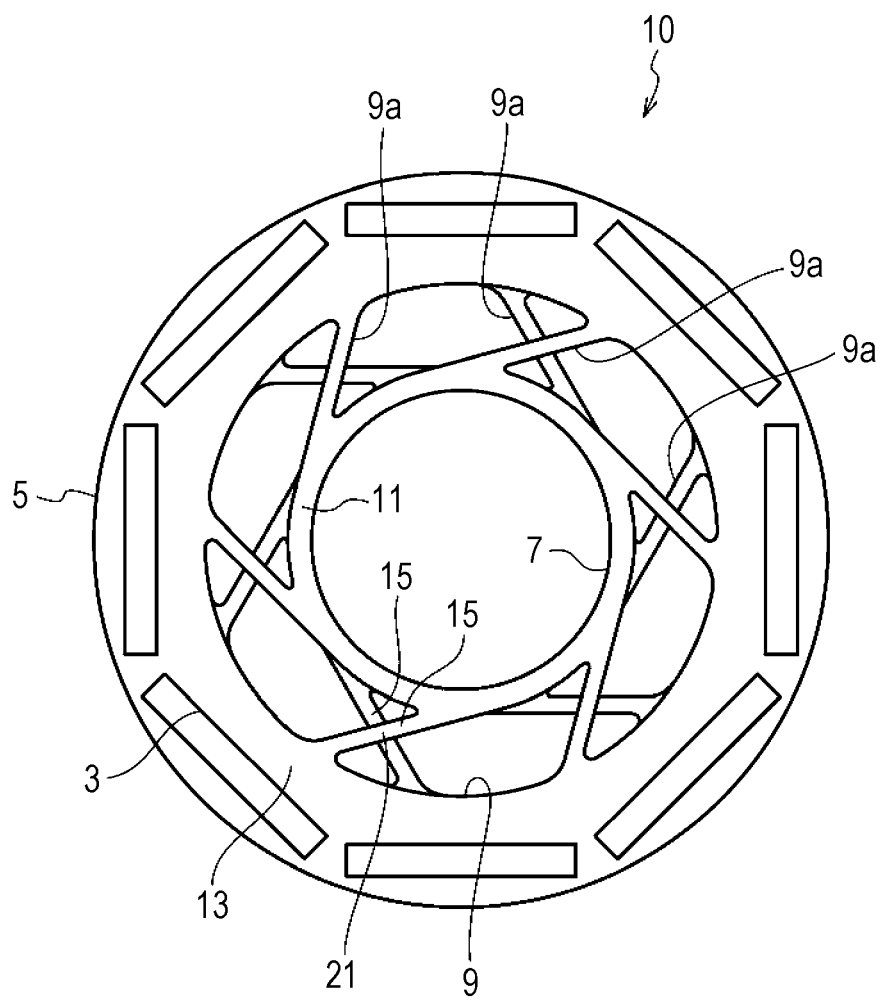
FIG. 11 is a front view of the rotor according to the third embodiment.

As illustrated in FIGS. 10 and 11, the rotor core 5 formed of the first and second cores 17, 19 stacked in this manner includes the magnet insertion holes 3 each formed of corresponding magnet insertion piece holes 3a of the steel plates 1, the through holes 9 each formed of corresponding through piece holes 9a of the steel plates 1, and the radially inner side rotor core 11 and the radially outer side rotor core 13 which are respectively formed of the radially inner side annular rings 11a and the radially outer side annular rings 13a of the steel plates 1.

Here, the ribs 15 of the first core 17 extend in one of circumferential directions (counterclockwise direction) as the ribs 15 come closer to the radially outer side, the ribs 15 of the second core 19 extend in the other one of circumferential directions (clockwise direction) as the ribs 15 come closer to the radially outer side, and thus the ribs 15 of the first core 17 and the ribs 15 of the second core 19 intersect with each other when viewed in the axial direction (see FIG. 11).

Therefore, circumferentially adjacent through piece holes 9a in the first core 17 (the second core 19) allow communication with each other via a through piece hole 9a in the axially stacked second core 19 (the first core 17). Consequently, a configuration is achieved in which all the through piece holes 9a of all the steel plates 1 communicate with each other, and thus in the environment of oil (for liquid cooling), it is possible to reduce occurrence of densely trapped oil in a particular through piece hole 9a and the eccentricity of the rotor 10 may be reduced.

Also, when the rotor core 5 is viewed in the axial direction (see FIG. 11), the number of ribs 15 that connect the radially inner side rotor core 11 and the radially outer side rotor core 13 is the number (12) which is twice the number (6) of rib 15 in each steel plate 1 (the first core 17 or the second core 19). Therefore, a stress applied to the rotor shaft and/or the radially inner side rotor core 11 is likely to be distributed, and thus increasing in size of the rotor shaft and/or the radially inner side rotor core 11 for the purpose of maintaining the strength of the rotor core 105 may be avoided.

In addition, the ribs 15 of the first core 17 and the ribs 15 of the second core 19 intersect with each other when viewed in the axial direction, and thus the area of communicating part of circumferentially adjacent through piece holes 9a in the first core 17 (the second core 19) may be increased. Also, circumferentially adjacent through piece holes 9a allow communication with each other on the radially inner side and the radially outer side of cross portions 21 between the ribs 15 of the first core 17 and the ribs 15 of the second core 19. Therefore, in a situation where the rotor 10 in the present embodiment is used, for example, in a vehicle and an inertial force is applied in various directions as the vehicle turns or accelerates/decelerates, oil may spread over more easily.

In the present embodiment, the first and second cores 17, 19 are formed by stacking the first and second steel plate 1A, 1B, respectively. The first and the second cores 17, 19, however, may be formed of a predetermined number of steel plates 1, and may be formed of a single steel plate 1, for example.

In addition, the rotor core 5 may be formed by stacking the first and second cores 17, 19 alternately.

Fourth Embodiment

Next, a rotor for a rotary electric machine according to a fourth embodiment of the present disclosure will be described. Because the rotor 10 in the present embodiment illustrated in FIGS. 13 and 14 has substantially the same configuration as that of the above-described embodiments, the same components are denoted by the same symbols and a description thereof will be omitted.

Figure 12:
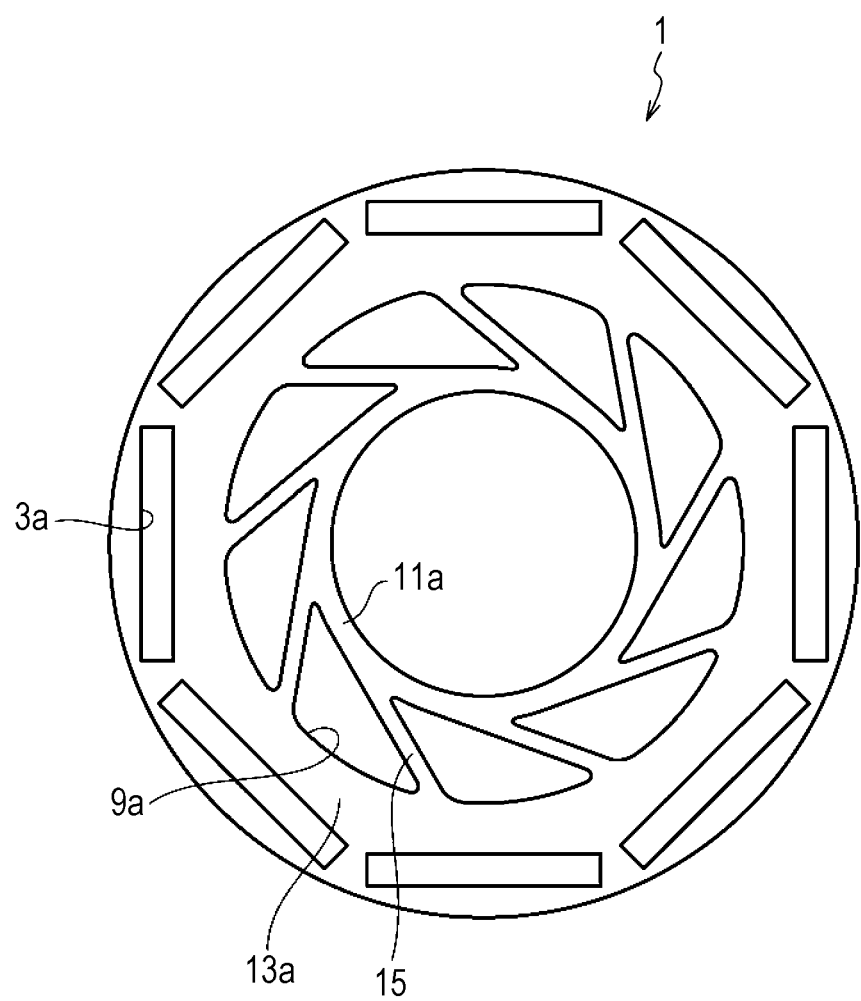
FIG. 12 is a front view of a steel plate according to a fourth embodiment.

As illustrated in FIG. 12, in the steel plate 1 in the present embodiment, a plurality of (8) magnet insertion piece holes 3a is formed so that the first circumferential space is 45° space, and a plurality of (9) through piece holes 9a is formed so that the second circumferential space is 40° space.

Figure 13:
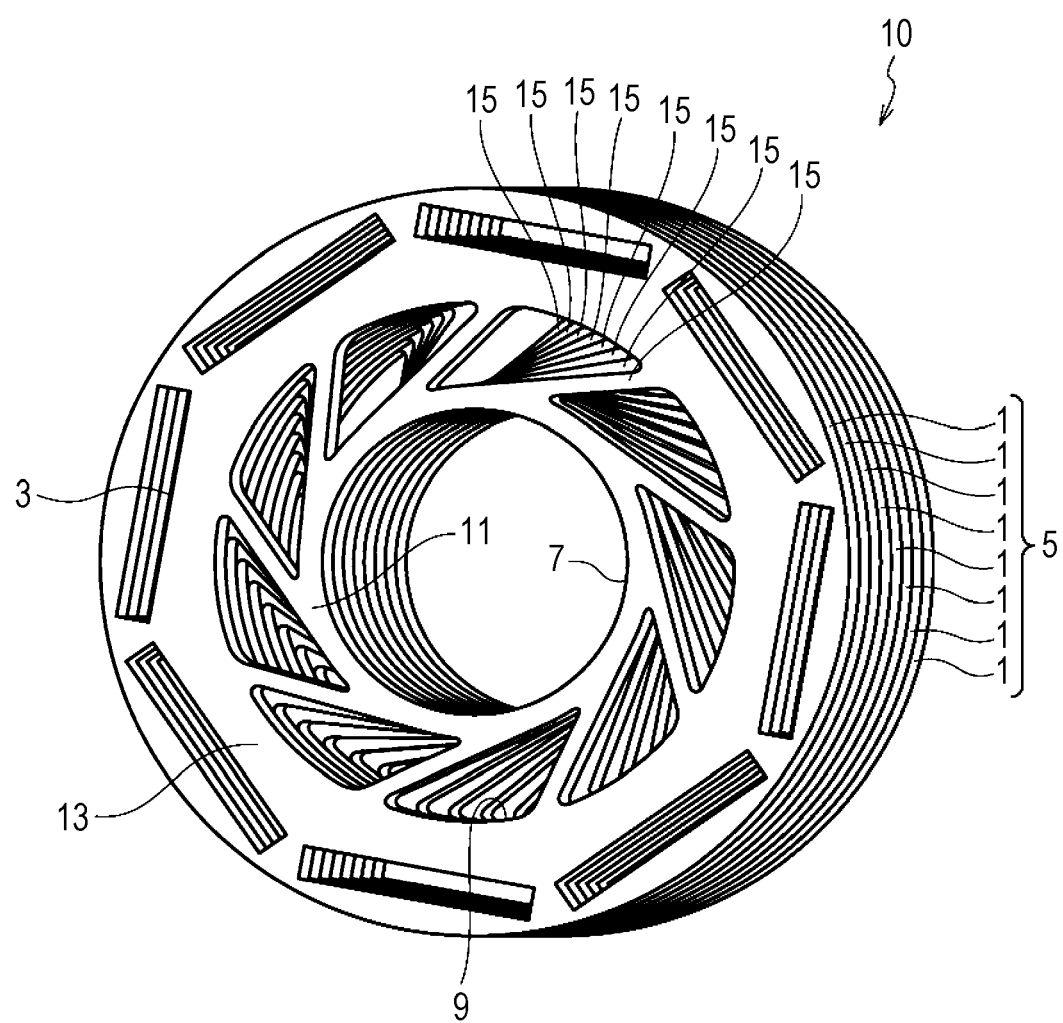
FIG. 13 is a perspective view of a rotor according to the fourth embodiment.
Figure 14:
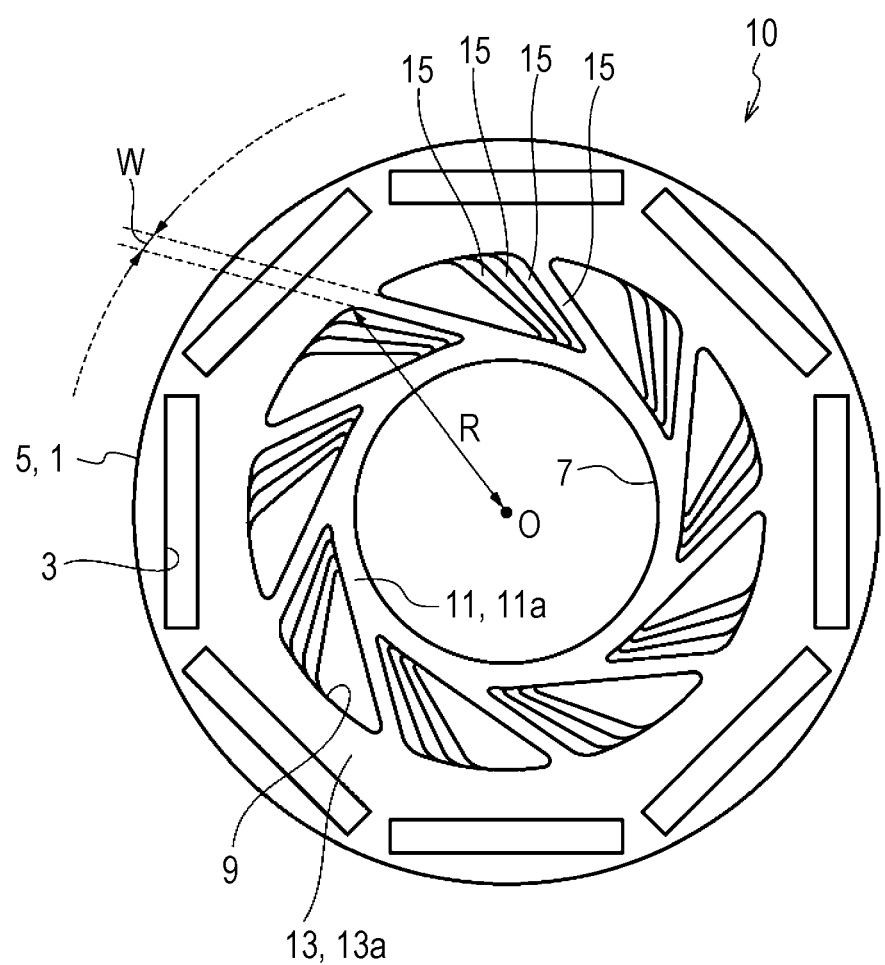
FIG. 14 is a front view of the rotor according to the fourth embodiment.

As illustrated in FIGS. 13 and 14, the rotor core 5 is formed by stacking (for example, rotational stacking) a plurality of steel plates 1 having the same shape such that each one steel plate 1 on top of another steel plate 1 is rotated for the first circumferential space (45°) with respect to the another steel plate 1. FIG. 13 illustrates the manner in which 8 steel plates 1 are rotationally stacked, and FIG. 14 illustrates the manner in which 4 steel plates 1 are rotationally stacked.

Because the difference between the first and second circumferential spaces is set to a very small value 5°, parts of the ribs 15 of steel plates 1 which are axially adjacent and circumferentially displaced by 5° overlap between a connecting portion with the radially inner side annular ring 11a (the radially inner side rotor core 11) and a connecting portion with the radially outer side annular ring 13a (the radially outer side rotor core 13) when viewed in the axial direction. In order to make the ribs 15 of steel plates 1 overlap in this manner, it is sufficient to have the following settings. That is, it is sufficient to set that the circumferential width W of the ribs 15 is constant and W≥2πR×{the difference between the first and second circumferential spaces)(5°)/360°} where R is the radius from the center O of the rotor core 5 to the connecting portion with the radially outer side rotor core 13.

Therefore, corresponding through piece holes 9a of axially adjacent steel plates 1 axially extend while being circumferentially displaced to form a through hole 9. Thus, even when oil flows into a certain through piece hole 9a, the oil is distributed in a circumferential direction and it is possible to reduce occurrence of trapped oil in a particular circumferential position, and thus the eccentricity of the rotor 10 may be reduced.

Also, a process of flipping over and stacking the steel plates 1 as in Japanese Patent No. 5118920 is unnecessary, and thus decrease in production efficiency may be reduced.

In addition, when the rotor core 5 is viewed in the axial direction (see FIG. 14), the number of ribs 15 that connect the radially inner side rotor core 11 and the radially outer side rotor core 13 is larger than the number (9) of ribs 15 in each steel plate 1. Therefore, a stress applied to the rotor shaft and/or the radially inner side rotor core 11 is likely to be distributed, and thus increasing in size of the rotor shaft and/or the radially inner side rotor core 11 for the purpose of maintaining the strength of the rotor core 105 may be avoided.

The rotor core 5 in the present embodiment is not limited to be formed by rotating and stacking every steel plate 1 with the first circumferential space (45° space), and the rotor core 5 may be formed by rotating and stacking one out of every several steel plates 1 with the first circumferential space (45° space). That is, the rotor core 5 may be formed in such a manner that a plurality of steel plates 1 are stacked without being rotated in a circumferential direction so as to form a core block, and one of axially adjacent core blocks is rotated with respect to the other for the first circumferential space (45° space) and stacked.

When the rotor core 5 is formed by rotationally stacking the steel plates 1 with the first circumferential space, a general manufacturing device, which performs rotational stacking, allows circumferentially adjacent through piece holes 9a to communicate with each other via a through piece hole 9a of another steel plate 1 which is circumferentially rotated and axially stacked. Therefore, it is possible to reduce the complexity of the manufacturing device used for rotation of the steel plates in a circumferential direction.

In the case where the rotor core 5 to be mounted on a rotor shaft is formed such that a plurality of steel plates 1 are rotated for the first circumferential space and stacked, in contrast to the case where the rotor core 5 is formed by rotationally stacking each of the steel plates for example one by one, it is sufficient that a core block having a plurality of steel plates 1 stacked is rotated and stacked only for appropriate number of times when mounted on a rotor shaft, and thus increase in the number of rotations to be made may be reduced and decrease in manufacturing efficiency may be reduced.

(First Modification)

In the above-described fourth embodiment, when 72 steel plates 1 or more are rotationally stacked with the first circumferential space (45° space) for each steel plate 1, a predetermined through piece hole 9a at one axial end and a predetermined through piece hole 9a at the other axial end are displaced by 360° or more in a circumferential direction. Therefore, each through hole 9 including a plurality of through piece holes 9a is formed to allow spiral communication from the predetermined through piece hole 9a of a steel plate 1 at one axial end of the rotor core 5 to the predetermined through piece hole 9a of another steel plate 1 at the other axial end, and the through hole 9 is formed to wind (is twisted) for at least 360° or more from the one axial end to the other axial end within the rotor core 5.

Figure 15:
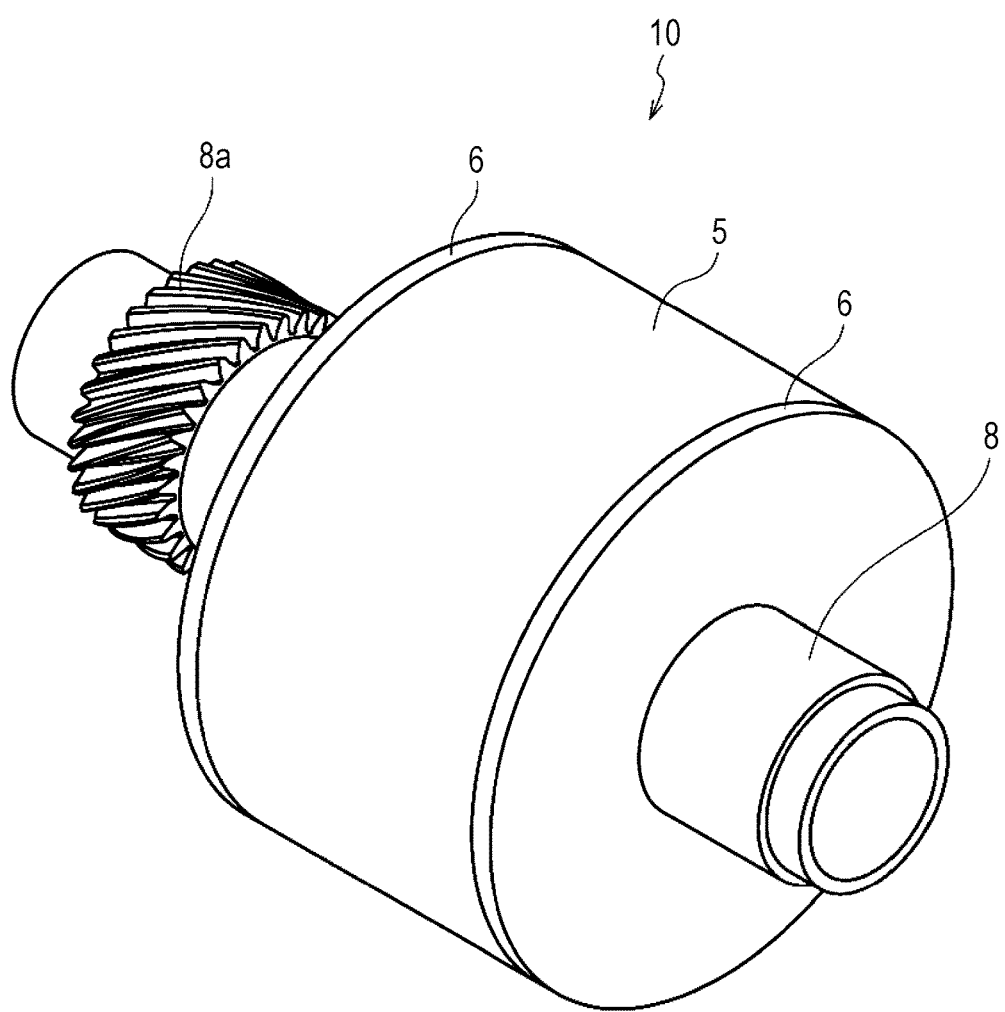
FIG. 15 is a perspective view of a rotor according to a first modification.

FIG. 15 illustrates a rotor 10 including the rotor core 5 according to this modification. The rotor 10 includes a rotor shaft 8 inserted in the shaft hole 7 (see FIGS. 13 and 14) of the rotor core 5, and a pair of end face plates 6 which is disposed at both axial end faces of the rotor core 5 to regulate axial displacement of a permanent magnet. The other axial end (the left side in FIG. 15) of the rotor shaft 8 is provided with a gear 8a that transmits the power of the rotor 10 to a gearbox and/or other power sources.

In such a rotor 10, the end face plates 6 disposed at both axial end faces of the rotor core 5 prevent oil from flowing into the through hole 9. However, oil may flow into a through piece hole 9a from a gap between stacked steel plates 1. However, in the rotor core 5 of the present modification, the through hole 9 is formed so as to wind for at least 360° or more from the one axial end to the other axial end within the rotor core 5, and thus oil within a predetermined through hole 9 may be distributed over the entire circumference of the rotor core 5 and the eccentricity of the rotor 10 may be reduced.

(Second Modification)

Figure 16:
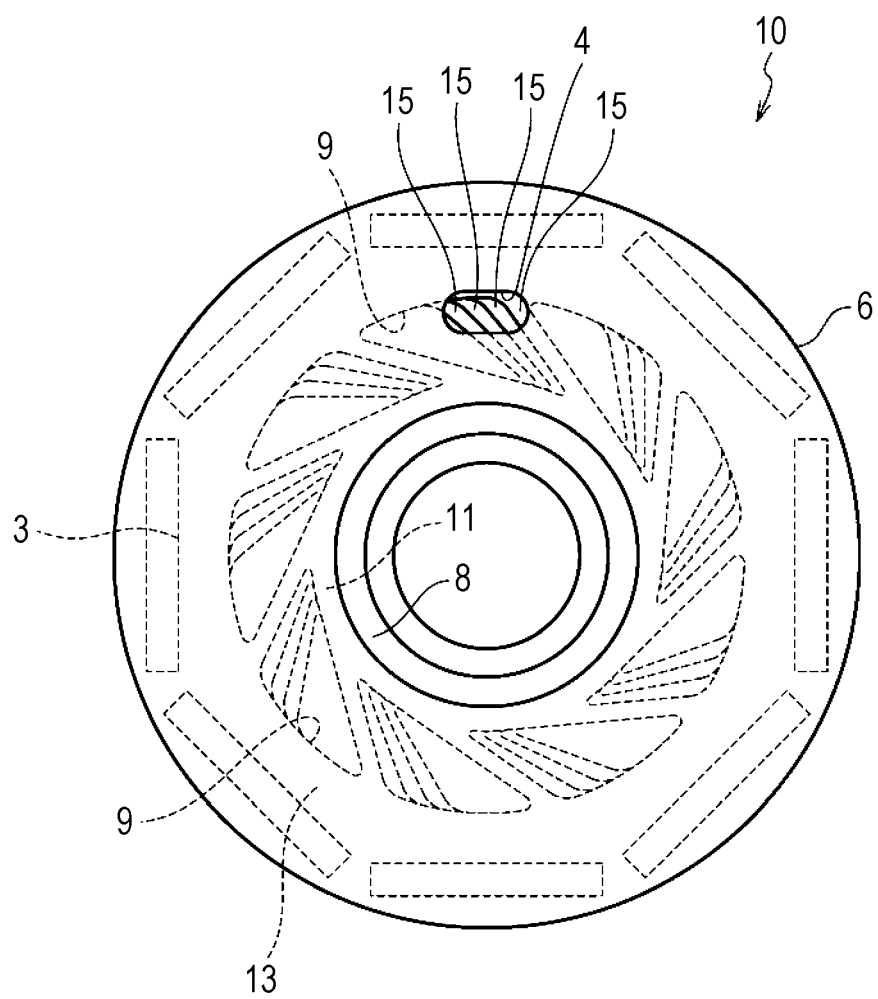
FIG. 16 is a front view of a rotor according to a second modification.
Figure 17:
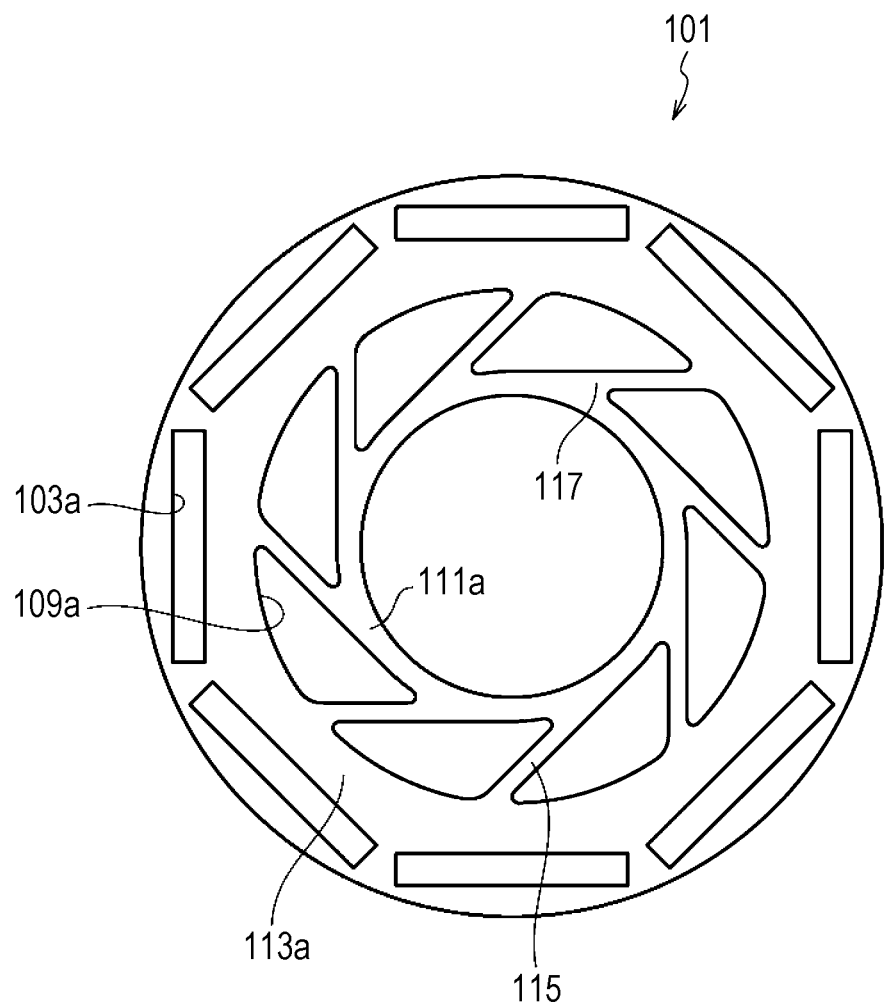
FIG. 17 is a front view of a conventional steel plate.

Next, a second modification will be described in which a cooling medium flows through a predetermined through hole 9 so as to cool the rotor core 5 in the first modification. FIG. 16 illustrates a view of the rotor 10 of FIG. 15 from the one axial end (the right side in FIG. 15). In the present modification, an oil introduction hole 4 is formed in an end face plate 6, the oil introduction hole penetrating through the end face plate in the axial direction and communicating with a predetermined through hole 9. It is to be noted that FIG. 16 illustrates the manner in which 4 steel plates 1 are rotationally stacked for the sake of simplicity, but actually 72 steel plates 1 or more are rotationally stacked as described above.

With this configuration, when oil is supplied from the one axial end to the predetermined through hole 9 via the oil introduction hole 4, the through hole 9 winds for 360° or more from the one axial side to the other axial side within the rotor core 5, and thus the inside of the rotor core 5 may be efficiently cooled in all circumferential directions.

Because the through hole 9 allows spiral communication from the one side to the other side of the rotor core 5, rotation of the rotor 10 allows oil to be guided from the one axial side to the other axial side within the through hole 9 and further to be supplied to the gear 8a of the rotor shaft 8.

The number of oil introduction holes 4 provided in an end face plate 6 is not limited to one and a plurality of oil introduction holes 4 may be provided so that oil is supplied to each through hole 9. In this case, it is possible to improve the cooling efficiency within the rotor core 5 and the efficiency of supplying oil to the gear 8a of the rotor shaft 8.

Figure 18:
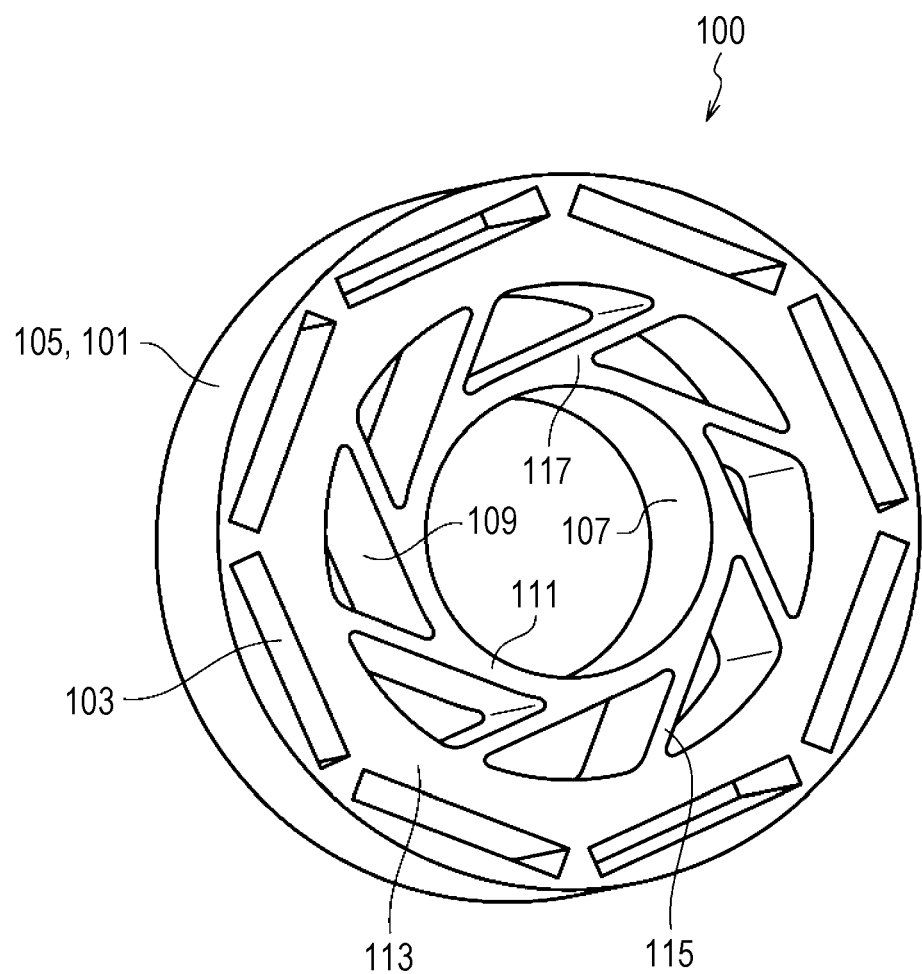
FIG. 18 is a perspective view of a conventional rotor.

If such an oil supply mechanism is provided in a conventional rotor 100 as illustrated in FIG. 18, oil needs to be supplied to each through hole 109 in order to supply oil in all circumferential directions of the rotor core 105. Therefore, the number of oil introduction holes provided in an end face plate needs to be the same as the number of the through holes 109. That is, in the case where only one oil introduction hole is provided in an end face plate as in the present modification, cooling in the rotor core 105 may not be sufficient.

The rotor 10 for a rotary electric machine in the present disclosure is not limited to the embodiments described above, and appropriate modification and improvement may be made.

In the environment of oil (for liquid cooling), oil may flow into a through piece hole from a gap between the stacked steel plates, and densely trapped oil in a particular through piece hole may cause eccentricity (unbalance). In the case where eccentricity occurs, vibration and/or sound increase at the time of rotation, thereby reducing the marketability.

A first aspect of the present disclosure provides a rotor (for example, the rotor 10 for a rotary electric machine in the above-described embodiment) for a rotary electric machine, the rotor including: a rotor core (for example, the rotor core 5 in the above-described embodiment) including a plurality of stacked steel plates (for example, the steel plates 1 in the above-described embodiment) and having a plurality of magnet insertion holes (for example, the magnet insertion holes 3 in the above-described embodiment) which are formed at every first circumferential space; and a permanent magnet inserted in each of the magnet insertion holes, wherein the steel plates included in the rotor core each includes a plurality of magnet insertion piece holes (for example, the magnet insertion piece holes 3a in the above-described embodiment) which are formed at every first circumferential space and constitute the magnet insertion holes when the steel plates are stacked, and a plurality of through piece holes (for example, the through piece holes 9a in the above-described embodiment) which penetrate the steel plates at every second circumferential space in an axial direction on a radially inner side of the magnet insertion piece holes, in the steel plates, a radially inner side annular ring (for example, the radially inner side annular ring 11a in the above-described embodiment) formed on a radially inner side of the through piece holes and a radially outer side annular ring (for example, the radially outer side annular ring 13a in the above-described embodiment) formed on a radially outer side of the through piece holes are connected by a plurality of ribs (for example, the ribs 15 in the above-described embodiment) which are formed between the through piece holes, the first circumferential space and the second circumferential space are different from each other, and in the rotor core, one out of every predetermined number of the steel plates is rotated for the first circumferential space and stacked.

Therefore, through piece holes of the steel plates, which are circumferentially rotated and axially stacked, communicate with each other axially with a circumferential difference between the first and second circumferential spaces. Thus, circumferentially adjacent through piece holes allow communication with each other via a through piece hole of another steel plate which is circumferentially rotated and axially stacked. This provides a configuration that allows communication between through piece holes, thus it is possible to reduce occurrence of densely trapped oil in a particular through piece hole and the eccentricity of the rotor may be reduced. In addition, a conventional process of flipping over and stacking steel plates as in Japanese Patent No. 5118920 is unnecessary, and thus reduction in production efficiency may be reduced. Also, when a plurality of steel plates are stacked to form a rotor core, a radially inner side rotor core and a radially outer side rotor core are formed by the radially inner side annular rings and the radially outer side annular rings of the steel plates, and when viewed in the axial direction, the number of ribs that connect the radially inner side rotor core and the radially outer side rotor core is larger than the number of ribs that connect the radially inner side annular ring and the radially outer side annular ring in a steel plate. Therefore, a stress applied to the rotor shaft and/or the radially inner side rotor core to be inserted into the rotor core is likely to be distributed via the ribs, and thus increasing in size of the rotor shaft and/or the radially inner side rotor core may be avoided.

In the case where the second circumferential space is smaller than the first circumferential space, the number of ribs formed between the through piece holes is relatively large, that is, the area of the ribs is larger relative to the area of the through piece holes, and thus when the steel plates are rotated and stacked, the ribs of axially adjacent steel plates are likely to overlap when viewed in the axial direction. In this case, circumferentially adjacent through piece holes are not likely to communicate with each other via a through piece hole of another steel plate which is circumferentially rotated and axially stacked. In addition to the first aspect, a second aspect of the present disclosure provides the rotor for a rotary electric machine, in which the second circumferential space is larger than the first circumferential space. Therefore, the number of ribs formed between the through piece holes is relatively small, and thus when the steel plates are rotated and stacked, ribs of axially adjacent steel plates are not likely to overlap when viewed in the axial direction, and circumferentially adjacent through piece holes may be likely to communicate with each other.

In addition to the second aspect, a third aspect of the present disclosure provides the rotor for a rotary electric machine, in which the second circumferential space is an integral multiple of the first circumferential space. Thus, circumferentially adjacent through piece holes may be likely to communicate with each other. Therefore, it is possible to further reduce occurrence of densely trapped oil in a particular through piece hole and the eccentricity of the rotor may be further reduced.

In addition to the second aspect, a fourth aspect of the present disclosure provides the rotor for a rotary electric machine, in which the second circumferential space is not an integral multiple of the first circumferential space. Thus after rotational stacking is performed for the number of times corresponding to the angle of the least common multiple of the second circumferential space and the first circumferential space, the through piece holes (ribs) in the current steel plate are disposed at the original position. Therefore, when viewed in the axial direction, the number of ribs that connect the radially inner side rotor core and the radially outer side rotor core may be increased, and thus a stress applied to the rotor shaft and/or the radially inner side rotor core is more likely to be distributed via the ribs.

In addition to the first aspect, a fifth aspect of the present disclosure provides the rotor for a rotary electric machine, in which the first circumferential space is larger than the second circumferential space and is not an integral multiple of the second circumferential space. Thus, the number of ribs formed between the through piece holes is relatively large. In addition, the first circumferential space is not an integral multiple of the second circumferential space, and thus after rotational stacking is performed for the number of times corresponding to the angle of the least common multiple of the second circumferential space and the first circumferential space, the through piece holes (ribs) in the current steel plate are disposed at the original position. Therefore, when viewed in the axial direction, the number of ribs that connect the radially inner side rotor core and the radially outer side rotor core may be increased, and thus a stress applied to the rotor shaft and/or the radially inner side rotor core is more likely to be distributed via the ribs.

In addition to the first aspect, a sixth aspect of the present disclosure provides the rotor for a rotary electric machine, in which the rotor core is formed by rotationally stacking the steel plates with the first circumferential space. Thus, a general manufacturing device, which performs rotational stacking, allows circumferentially adjacent through piece holes to communicate with each other via a through piece hole of another steel plate which is circumferentially rotated and axially stacked. Therefore, it is possible to reduce the complexity of the manufacturing device for rotating the steel plates in a circumferential direction.

In addition to the first aspect, a seventh aspect of the present disclosure provides the rotor for a rotary electric machine, in which the rotor core, when mounted on a rotor shaft (for example, rotor shaft 8 of the above-described embodiment), is formed such that several of the steel plates are rotated for the first circumferential space and stacked. Thus, in contrast to the case where the rotor core is formed by rotationally stacking the steel plates for example one by one, it is sufficient that a core block having several steel plates stacked is rotated and stacked only for appropriate number of times when mounted on a rotor shaft, and thus increase in the number of rotations to be made may be reduced and decrease in manufacturing efficiency may be reduced.

An eighth aspect of the present disclosure provides a rotor (for example, the rotor 10 for a rotary electric machine in the above-described embodiment) for a rotary electric machine, the rotor including: a rotor core (for example, the rotor core 5 in the above-described embodiment) including a plurality of stacked steel plates (for example, the steel plates 1 in the above-described embodiment) and having a plurality of magnet insertion holes (for example, the magnet insertion holes 3 in the above-described embodiment) which are formed at every first circumferential space; and a permanent magnet inserted in each of the magnet insertion holes, wherein the steel plates included in the rotor core each includes a plurality of magnet insertion piece holes (for example, the magnet insertion piece holes 3a in the above-described embodiment) which are formed at every first circumferential space and constitute the magnet insertion holes when the steel plates are stacked, and a plurality of through piece holes (for example, the through piece holes 9a in the above-described embodiment) which penetrate the steel plates at every second circumferential space in an axial direction on a radially inner side of the magnet insertion piece holes, in the steel plates, a radially inner side annular ring (for example, the radially inner side annular ring 11a in the above-described embodiment) formed on a radially inner side of the through piece holes and a radially outer side annular ring (for example, the radially outer side annular ring 13a in the above-described embodiment) formed on a radially outer side of the through piece holes are connected by a plurality of ribs (for example, the ribs 15 in the above-described embodiment) which are formed between the through piece holes, the ribs are formed to extend in one of circumferential directions as the ribs come closer to a radially outer side, and the rotor core includes a first core (for example, the first core 17 in the above-described embodiment) in which a predetermined number of the steel plates are stacked in a predetermined direction, and a second core (for example, the second core 19 in the above-described embodiment) in which a predetermined number of the steel plates are stacked in a direction opposite to the stacking direction of the first core.

Therefore, circumferentially adjacent through piece holes allow communication with each other via a through piece hole of another steel plate which is flipped over and stacked. This provides a configuration that allows communication between through piece holes, thus it is possible to reduce occurrence of densely trapped oil in a particular through piece hole and the eccentricity of the rotor may be reduced. Also, when a plurality of steel plates are stacked to form a rotor core, a radially inner side rotor core and a radially outer side rotor core are formed by the radially inner side annular rings and the radially outer side annular rings of the steel plates, and when viewed in the axial direction, the number of ribs that connect the radially inner side rotor core and the radially outer side rotor core is larger than the number of ribs that connect the radially inner side annular ring and the radially outer side annular ring in a steel plate. Therefore, a stress applied to the rotor shaft and/or the radially inner side rotor core is likely to be distributed, and thus increasing in size of the rotor shaft and/or the radially inner side rotor core may be avoided. In addition, the ribs of (the steel plates included in) the first core and the ribs of (the steel plates included in) the second core are disposed to intersect with each other when viewed in the axial direction, and thus the area of communicating part of circumferentially adjacent through piece holes may be increased. Also, circumferentially adjacent through piece holes allow communication with each other on the radially inner side and the radially outer side of cross portions between the ribs of the first core and the ribs of the second core, and thus in a situation where the rotor is used, for example, in a vehicle and an inertial force is applied in various directions as the vehicle turns or accelerates/decelerates, oil may spread over more easily.

A ninth aspect of the present disclosure provides a rotor (for example, the rotor 10 for a rotary electric machine in the above-described embodiment) for a rotary electric machine, the rotor including: a rotor core (for example, the rotor core 5 in the above-described embodiment) including a plurality of stacked steel plates (for example, the steel plates 1 in the above-described embodiment) and having a plurality of magnet insertion holes (for example, the magnet insertion holes 3 in the above-described embodiment) which are formed at every first circumferential space; and a permanent magnet inserted in each of the magnet insertion holes, wherein the steel plates included in the rotor core each includes a plurality of magnet insertion piece holes (for example, the magnet insertion piece holes 3a in the above-described embodiment) which are formed at every first circumferential space and constitute the magnet insertion holes when the steel plates are stacked, and a plurality of through piece holes (for example, the through piece holes 9a in the above-described embodiment) which penetrate the steel plates at every second circumferential space in an axial direction on a radially inner side of the magnet insertion piece holes, in the steel plates, a radially inner side annular ring (for example, the radially inner side annular ring 11a in the above-described embodiment) formed on a radially inner side of the through piece holes and a radially outer side annular ring (for example, the radially outer side annular ring 13a in the above-described embodiment) formed on a radially outer side of the through piece holes are connected by a plurality of ribs (for example, the ribs 15 in the above-described embodiment) which are formed between the through piece holes, the first circumferential space and the second circumferential space are different from each other, in the rotor core, one out of every predetermined number of the steel plates is rotated for the first circumferential space and stacked, and parts of the ribs of the steel plates, which are axially adjacent and circumferentially displaced, overlap between a connecting portion with the radially inner side annular ring and a connecting portion with the radially outer side annular ring when viewed in the axial direction.

Therefore, through piece holes of the steel plates, which are circumferentially rotated and axially stacked, communicate with each other axially with a circumferential difference between the first and second circumferential spaces. Parts of the ribs of the steel plates, which are axially adjacent and circumferentially displaced, overlap between a connecting portion with the radially inner side annular ring and a connecting portion with the radially outer side annular ring when viewed in the axial direction, and thus corresponding through piece holes of axially adjacent steel plates axially extend while being circumferentially displaced. Thus, even when oil flows into a certain through piece hole or oil is intentionally caused to flow into a certain through piece hole, the oil is distributed in a circumferential direction and it is possible to reduce occurrence of trapped oil in a particular circumferential position, and thus the eccentricity of the rotor may be reduced. In addition, a conventional process of flipping over and stacking steel plates as in Japanese Patent No. 5118920 is unnecessary, and thus reduction in production efficiency may be reduced. Also, when a plurality of steel plates are stacked to form a rotor core, a radially inner side rotor core and a radially outer side rotor core are formed by the radially inner side annular rings and the radially outer side annular rings of the steel plates, and when viewed in the axial direction, the number of ribs that connect the radially inner side rotor core and the radially outer side rotor core is larger than the number of ribs that connect the radially inner side annular ring and the radially outer side annular ring in a steel plate. Therefore, a stress applied to the rotor shaft and/or the radially inner side rotor core is likely to be distributed via the ribs, and thus increasing in size of the rotor shaft and/or the radially inner side rotor core may be avoided.

In addition to the ninth aspect, a tenth aspect of the present disclosure provides the rotor for a rotary electric machine, in which in the case where one out of every predetermined number of the steel plates is rotated for the first circumferential space and stacked in the rotor core, the rotor core has a predetermined through hole (for example, the through hole 9 in the above-described embodiment) that allows spiral communication from a predetermined through piece hole of one of the steel plates at one axial end to the predetermined through piece hole of one of the steel plates at the other axial end, and the predetermined through hole is formed to wind for at least 360° or more from the one axial end to the other axial end within the rotor core. Thus, oil flown into a predetermined through hole may be distributed over the entire circumference of the rotor core and the eccentricity of the rotor may be reduced more effectively. In the case where the rotor core is cooled by passing a cooling medium through a predetermined through hole, the entire circumference of the rotor core may be cooled by the cooling medium passing through the predetermined through hole, and thus the cooling efficiency may be improved.

In addition to the ninth or tenth aspect, an eleventh aspect of the present disclosure provides the rotor for a rotary electric machine, in which the rotor core is formed by rotationally stacking the steel plates. Thus, a general manufacturing device, which performs rotational stacking, allows circumferentially adjacent through piece holes to communicate with each other via a through piece hole of another steel plate which is circumferentially rotated and axially stacked. Therefore, it is possible to reduce the complexity of the manufacturing device for rotating the steel plates in a circumferential direction.

In addition to the ninth or tenth aspect, a twelfth aspect of the present disclosure provides the rotor for a rotary electric machine, in which the rotor core, when mounted on a rotor shaft, is formed by rotating the steel plates for the first circumferential space and stacking the steel plates. Thus, in contrast to the case where the rotor core is formed by rotationally stacking the steel plates for example one by one, it is sufficient that a core block having several steel plates stacked is rotated and stacked only for appropriate number of times when mounted on a rotor shaft, and thus increase in the number of rotations to be made may be reduced and decrease in manufacturing efficiency may be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor for a rotary electric machine, comprising:
a rotor core being rotatable around a rotational axis, the rotor core including a plurality of steel plates stacked in a stacking direction parallel to the rotational axis and having a plurality of magnet insertion holes at every first circumferential space, each of the plurality of steel plates comprising:
   a plurality of magnet insertion piece holes provided at every said first circumferential space, the plurality of magnet insertion piece holes constituting the plurality of magnet insertion holes when the plurality of steel plates are stacked in the stacking direction while the plurality of steel plates are rotated by the first circumferential space and a predetermined number of the plurality of steel plates are stacked in the stacking direction;
   a plurality of through piece holes penetrating each of the plurality of steel plates at every second circumferential space in the stacking direction on a radially inner side of the plurality of magnet insertion piece holes, the first circumferential space and the second circumferential space being different from each other;
   a radially inner side annular ring provided on a radially inner side of the plurality of through piece holes;
   a radially outer side annular ring provided on a radially outer side of the plurality of through piece holes; and
   a plurality of ribs provided between the plurality of through piece holes and connecting the radially inner side annular ring and the radially outer side annular ring,
wherein a first one of the magnet insertion piece holes of a first one of the steel plates entirely overlaps a second one of the magnet insertion piece holes of a second one of the steel plates when viewed in the stacking direction, and
wherein a first one of the through piece holes of the first one of the steel plates partially overlaps a second one of the through piece holes of the second one of the steel plates when viewed in the stacking direction.

2. The rotor according to claim 1,
wherein the second circumferential space is larger than the first circumferential space.

3. The rotor according to claim 2,
wherein a number of the second circumferential spaces is an integral multiple of a number of the first circumferential spaces.

4. The rotor according to claim 2,
wherein a number of the second circumferential spaces is not an integral multiple of a number of the first circumferential spaces.

5. The rotor according to claim 1,
wherein a number of the first circumferential spaces is larger than a number of the second circumferential spaces and is not an integral multiple of the number of the second circumferential spaces.

6. The rotor according to claim 1,
wherein the rotor core is provided by stacking the plurality of steel plates with the first circumferential space while the plurality of steel plates are rotated in a process of punching the plurality of steel plates.

7. The rotor according to claim 1,
wherein the rotor core, when mounted on a rotor shaft, is provided such that several of the plurality of steel plates are rotated by the first circumferential space and stacked.

8. The rotor according to claim 1, further comprising:
a permanent magnet inserted in each of the plurality of magnet insertion holes.

9. The rotor according to claim 1,
wherein the first one of the through piece holes includes a first portion and a second portion, the first portion overlapping the second one of the through piece holes and the second portion being circumferentially offset from the second one of the through piece holes so as to not overlap the second one of the through piece holes.

10. The rotor according to claim 1,
wherein the rotor core has a spiral-shaped through hole configured to provide communication from a through piece hole disposed at one axial end to a through piece hole at an opposing axial end, the spiral-shaped through hole being formed by some of the plurality of through piece holes.

11. The rotor according to claim 1,
wherein the first one of the magnet insertion piece holes of the first one of the steel plates is circumferentially adjacent to a third one of the magnet insertion piece holes of the second one of the steel plates such that the first one of the magnet insertion piece holes does not overlap the third one of the magnet insertion piece holes when viewed in the stacking direction.

12. A rotor for a rotary electric machine, comprising:
a rotor core being rotatable around a rotational axis, the rotor core including a plurality of steel plates stacked in a stacking direction parallel to the rotational axis and having a plurality of magnet insertion holes at every first circumferential space, each of the plurality of steel plates comprising:
  a plurality of magnet insertion piece holes provided at every said first circumferential space, the plurality of magnet insertion piece holes constituting the plurality of magnet insertion holes when the plurality of steel plates are stacked in the stacking direction while the plurality of steel plates are rotated by the first circumferential space and a predetermined number of the plurality of steel plates are stacked in the stacking direction;
  a plurality of through piece holes penetrating each of the plurality of steel plates at every second circumferential space in the stacking direction on a radially inner side of the plurality of magnet insertion piece holes, the first circumferential space and the second circumferential space being different from each other;
  a radially inner side annular ring provided on a radially inner side of the plurality of through piece holes;
  a radially outer side annular ring provided on a radially outer side of the plurality of through piece holes;
  a plurality of ribs provided between the plurality of through piece holes and connecting the radially inner side annular ring and the radially outer side annular ring, the plurality of ribs being axially adjacent and circumferentially displaced when viewed in the stacking direction, and parts of which overlap between a connecting portion with the radially inner side annular ring and a connecting portion with the radially outer side annular ring when viewed in the stacking direction,
wherein a first one of the magnet insertion piece holes of a first one of the steel plates entirely overlaps a second one of the magnet insertion piece holes of a second one of the steel plates when viewed in the stacking direction, and
wherein a first one of the through piece holes of the first one of the steel plates partially overlaps a second one of the through piece holes of the second one of the steel plates when viewed in the stacking direction.

13. The rotor according to claim 12,
wherein the rotor core is provided by stacking the plurality of steel plates while the plurality of steel plates are rotated in a process of punching the plurality of steel plates.

14. The rotor according to claim 12,
wherein the rotor core, when mounted on a rotor shaft, is provided by rotating the plurality of steel plates by the first circumferential space and stacking the plurality of steel plates.

15. The rotor according to claim 12, further comprising:
a permanent magnet inserted in each of the plurality of magnet insertion holes.

16. The rotor according to claim 12,
wherein the first one of the magnet insertion piece holes of the first one of the steel plates is circumferentially adjacent to a third one of the magnet insertion piece holes of the second one of the steel plates such that the first one of the magnet insertion piece holes does not overlap the third one of the magnet insertion piece holes when viewed in the stacking direction.

17. A rotor for a rotary electric machine, comprising:
a rotor core being rotatable around a rotational axis, the rotor core including a plurality of steel plates stacked in a stacking direction parallel to the rotational axis and having a plurality of magnet insertion holes at every first circumferential space, each of the plurality of steel plates comprising:
  a plurality of magnet insertion piece holes provided at every said first circumferential space, the plurality of magnet insertion piece holes constituting the plurality of magnet insertion holes in a state in which the plurality of steel plates are stacked in the stacking direction while the plurality of steel plates are rotated by the first circumferential space at every timing at which a predetermined number of the plurality of steel plates are stacked in the stacking direction;
  a plurality of through piece holes penetrating each of the plurality of steel plates at every second circumferential space in the stacking direction on a radially inner side of the plurality of magnet insertion piece holes, the first circumferential space and the second circumferential space being different from each other;
  a radially inner side annular ring provided on a radially inner side of the plurality of through piece holes;
  a radially outer side annular ring provided on a radially outer side of the plurality of through piece holes; and
  a plurality of ribs provided between the plurality of through piece holes and connecting the radially inner side annular ring and the radially outer side annular ring, the plurality of ribs being axially adjacent and circumferentially displaced when viewed in the stacking direction, and parts of which overlap between a connecting portion with the radially inner side annular ring and a connecting portion with the radially outer side annular ring when viewed in the stacking direction, wherein in a case where one out of every predetermined number of the plurality of steel plates is rotated by the first circumferential space and stacked in the rotor core, the rotor core has a predetermined through hole that allows spiral communication from a predetermined through piece hole of one of the plurality of steel plates at one axial end to the predetermined through piece hole of one of the plurality of steel plates at an other axial end, and the predetermined through hole is provided to wind for at least 360° or more from the one axial end to the other axial end within the rotor core.

\* \* \* \* \*